(12) United States Patent
Yamamoto et al.

(10) Patent No.: US 10,543,668 B2
(45) Date of Patent: Jan. 28, 2020

(54) PRESSURE-SENSITIVE ADHESIVE SHEET FOR MOBILE ELECTRONICS

(71) Applicant: NITTO DENKO CORPORATION, Ibaraki-shi, Osaka (JP)

(72) Inventors: Shuuhei Yamamoto, Ibaraki (JP); Kiichiro Matsushita, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 30 days.

(21) Appl. No.: 15/529,560

(22) PCT Filed: Nov. 27, 2015

(86) PCT No.: PCT/JP2015/083443
§ 371 (c)(1),
(2) Date: May 25, 2017

(87) PCT Pub. No.: WO2016/084946
PCT Pub. Date: Jun. 2, 2016

(65) Prior Publication Data
US 2017/0335142 A1 Nov. 23, 2017

(30) Foreign Application Priority Data

Nov. 28, 2014 (JP) ................................. 2014-242183
Aug. 21, 2015 (JP) ................................. 2015-164268

(51) Int. Cl.
*B32B 27/40* (2006.01)
*B32B 5/18* (2006.01)
(Continued)

(52) U.S. Cl.
CPC ............... *B32B 27/40* (2013.01); *B32B 5/18* (2013.01); *B32B 7/06* (2013.01); *B32B 7/12* (2013.01);
(Continued)

(58) Field of Classification Search
CPC .. B32B 27/40; B32B 7/12; B32B 7/14; B32B 2255/00; B32B 2255/26; C09J 7/38;
(Continued)

(56) References Cited

U.S. PATENT DOCUMENTS 5,234,734 A  8/1993 Hamada
6,197,397 B1  3/2001 Sher et al.
(Continued)

FOREIGN PATENT DOCUMENTS

JP  4-144798 A  5/1992
JP  2000-044903 A  2/2000
(Continued)

OTHER PUBLICATIONS

International Search Report for PCT/JP2015/083443 dated Feb. 16, 2016 [PCT/ISA/210].
(Continued)

*Primary Examiner* — Scott R. Walshon
*Assistant Examiner* — Jasper Saberi
(74) *Attorney, Agent, or Firm* — Sughrue Mion, PLLC

(57) ABSTRACT

Provided is a PSA sheet capable of bringing about good air release properties in mobile electronic applications. The present invention provides a PSA sheet for mobile electronics. The PSA sheet comprises a substrate film and a PSA layer provided to at least one face of the substrate film. The PSA layer has a thickness of 20 μm or less. The PSA sheet further comprises a coating layer that partially covers the PSA layer surface. The coating layer has a thickness less than 3 μm.

19 Claims, 3 Drawing Sheets

(51) Int. Cl.
  *B32B 7/06* (2019.01)
  *B32B 7/12* (2006.01)
  *B32B 27/36* (2006.01)
  *B32B 7/14* (2006.01)
  *C09J 133/14* (2006.01)

(52) U.S. Cl.
  CPC .............. *B32B 7/14* (2013.01); *B32B 27/36* (2013.01); *B32B 2255/00* (2013.01); *B32B 2255/10* (2013.01); *B32B 2255/102* (2013.01); *B32B 2255/26* (2013.01); *B32B 2266/025* (2013.01); *B32B 2266/0242* (2013.01); *B32B 2307/412* (2013.01); *B32B 2307/72* (2013.01); *B32B 2307/748* (2013.01); *B32B 2309/105* (2013.01); *C09J 133/14* (2013.01); *C09J 2201/122* (2013.01); *C09J 2201/128* (2013.01); *C09J 2201/16* (2013.01); *C09J 2201/32* (2013.01); *C09J 2201/40* (2013.01); *C09J 2201/606* (2013.01); *C09J 2203/326* (2013.01); *C09J 2205/114* (2013.01); *C09J 2423/006* (2013.01); *C09J 2433/00* (2013.01); *C09J 2433/006* (2013.01); *C09J 2467/006* (2013.01); *C09J 2475/005* (2013.01); *C09J 2493/00* (2013.01)

(58) Field of Classification Search
  CPC ...... C09J 7/385; C09J 7/387; C09J 2201/606; C09J 2203/326; C09J 2203/318; C09J 2203/33; C09J 2201/32; C09J 2201/40
  See application file for complete search history.

(56) References Cited

U.S. PATENT DOCUMENTS

| | | | | |
|---|---|---|---|---|
| 6,630,049 B2* | 10/2003 | Hannington | ........... | C09J 7/0203 156/230 |
| 7,060,351 B2* | 6/2006 | Hannington | ................ | C09J 7/38 428/343 |
| 7,332,205 B2* | 2/2008 | Hannington | .............. | B32B 9/00 428/40.1 |
| 7,344,618 B2* | 3/2008 | Hannington | ................ | C09J 7/38 156/277 |
| 7,820,288 B2* | 10/2010 | Hannington | ................ | C09J 7/38 428/343 |
| 8,084,124 B2* | 12/2011 | Hannington | ................ | C09J 7/10 428/343 |
| 8,252,403 B2* | 8/2012 | Hannington | ................ | C09J 7/38 428/40.1 |
| 2007/0224416 A1* | 9/2007 | Matsubayashi | ............ | C09J 7/38 428/343 |
| 2010/0065185 A1* | 3/2010 | Husemann | ................. | C09J 7/20 156/60 |
| 2010/0310866 A1* | 12/2010 | Yamamoto | ............... | C09J 7/385 428/354 |
| 2011/0300361 A1* | 12/2011 | Nakayama | ................. | C09J 7/29 428/220 |
| 2012/0157611 A1* | 6/2012 | Katami | ...................... | C09J 7/00 524/558 |
| 2014/0023861 A1 | 1/2014 | Satou et al. | | |

FOREIGN PATENT DOCUMENTS

| | | |
|---|---|---|
| JP | 2000-109763 A | 4/2000 |
| JP | 2000-160117 A | 6/2000 |
| JP | 2001-234130 A | 8/2001 |
| JP | 2003-531253 A | 10/2003 |
| JP | 2005-298543 A | 10/2005 |
| JP | 2006-070273 A | 3/2006 |
| JP | 2010-138260 A | 6/2010 |
| JP | 2014-019799 A | 2/2014 |
| JP | 2014-105262 A | 6/2014 |
| TW | 201406917 A | 2/2014 |
| WO | 01/081013 A1 | 11/2001 |

OTHER PUBLICATIONS

Written Opinion for PCT/JP2015/083443 dated Feb. 16, 2016 [PCT/IB/237].
Office Action dated Jun. 12, 2019 from the Taiwanese Intellectual Property Office in counterpart application No. 104139743.
Notice of Reasons for Refusal dated Jul. 4, 2019, from the Japanese Patent Office in counterpart application No. 2015-164268.
Decision of Refusal dated Sep. 12, 2019 from Japanese Patent Office in counterpart JP Application No. 2015-164268.

* cited by examiner

PRESSURE-SENSITIVE ADHESIVE SHEET FOR MOBILE ELECTRONICS

TECHNICAL FIELD

The present invention relates to a pressure-sensitive adhesive sheet for use in mobile electronics.

This application is a National Stage of International Application No. PCT/JP2015/083443, filed on Nov. 27, 2015, which claims priority to Japanese Patent Application No. 2014-242183 filed on Nov. 28, 2014 and Japanese Patent Application No. 2015-164268 filed on Aug. 21, 2015; the entire contents thereof are incorporated herein by reference.

BACKGROUND ART

In general, pressure-sensitive adhesive (or PSA; the same applies hereinafter) has characteristics to be in a soft solid (viscoelastic) state in a room temperature range and easily adhere to adherend with some pressure. With the benefit of such properties, PSA is widely used in forms of substrate-supported PSA sheets having a PSA layer at least on one face of the substrate for purposes including fastening and surface protection of various articles and obtaining desirable appearances such as for decorative purposes. Documents disclosing these types of conventional art include Patent Documents 1 and 2.

CITATION LIST

Patent Literature

[Patent Document 1] Japanese Patent Application Publication No. 2006-70273
[Patent Document 2] Japanese Patent Application Publication No. 2000-160117

SUMMARY OF INVENTION

Technical Problem

With respect to PSA sheets for the various purposes, when they are adhered to adherends, a fluid substance such as air may be left between the PSA sheets and the adherends to form bubbles and the like (trapped air, etc.), thereby causing degradation of the appearances. Such bubbles and the like are not desirable, either, in view of their negative impact on the adhesive properties such as reduced adhesive strength. To prevent formation of the bubbles and the like or to provide features (or air release properties) to eliminate the sort of bubbles if formed, there is a known technique by which ridges are formed on the surface of a release liner that protects the adhesive face of a PSA sheet and the ridges are used to form grooves in the PSA layer surface (Patent Document 1). Air and the like that are to remain between the adhesive face and the adherend can be eliminated through the grooves formed in the surface of the PSA layer. Patent Document 2 is a conventional art document that discloses a non-adhesive layer laminated partially on the surface of a PSA layer.

PSA sheets can be preferably applied to mobile electronics including smartphones which have been drastically widespread late years. Because of the mobile nature, there is strong demand for smaller and lighter mobile electronics. At the same time, higher capacities and greater performance are also expected without compromise in size and weight. Thus, PSA sheets used in mobile electronics also tend to be made narrower and thinner while maintaining required properties (e.g. adhesive strength). As for a PSA sheet having grooves in the adhesive face as suggested in Patent Document 1, however, with its thinning, the depth of the grooves will also be limited; and at or below a certain groove depth, the air release properties are impaired. In particular, even in an embodiment where ridges in a prescribed size are formed on a release liner and embossed as grooves on a PSA layer surface, when the depth of the grooves formed in the PSA layer surface is less than 3 μm, the PSA layer's viscoelasticity (which corresponds to the time from removal of the release liner to application to an adherend as well as to the temperature during this procedure, etc.) causes the grooves to fade or be lost before the PSA layer is applied to the adherend. As such, desirable air release properties cannot be obtained.

The present invention has been made based on these findings with an objective to provide a PSA sheet that has good air release properties with a smooth adhesive face and shows good adhesive properties from an early stage after applied to an adherend, for use in a mobile electronic device that allows a limited depth of the air eliminating means provided to the PSA layer.

Solution to Problem

The present invention provides a PSA sheet for mobile electronics. The PSA sheet comprises a substrate film and a PSA layer provided to at least one face of the substrate film. The PSA layer has a thickness of 20 μm or less. The PSA sheet further comprises a coating layer that partially covers the surface of the PSA layer. The coating layer has a thickness less than 3 μm.

As described above, in the PSA sheet whose PSA layer is limited in thickness, with the use of the coating layer having a thickness less than 3 μm, good air release properties are obtained. Thus, the PSA sheet in this embodiment is particularly preferable for use in applications that require thinning, mobile electronics in typical. In addition, because the coating layer provided on the PSA layer is limited to less than 3 μm in thickness, degradation of the smoothness of the PSA sheet's adhesive face caused by the coating layer is reduced or prevented. Furthermore, with the coating layer of such thickness, when applied to an adherend, the PSA sheet's adhesive face formed with PSA and the coating layer is likely to fit well to the adherend. Accordingly, the PSA sheet in this embodiment shows good adhesive properties from an early stage after applied to the adherend.

In a preferable embodiment of the PSA sheet disclosed herein, the PSA layer has a thickness $T_A$ and the coating layer has a thickness $T_C$ with a $T_C/T_A$ ratio of 0.75 or lower. In such an embodiment, degradation of the smoothness of the PSA sheet's adhesive face can be reduced to bring about excellent adhesive strength. When the coating layer's thickness is limited in relation to the PSA layer's thickness, for instance, in an embodiment where the coating layer is partially formed on the surface of a releasable support and a PSA layer is further formed thereon, the PSA is sufficiently supplied to the coating layer formed on the surface of the releasable support, resulting in good lamination. From such a standpoint, while satisfying the ratio ($T_C/T_A$), the PSA layer has a thickness of suitably 1 μm or greater, preferably 2 μm or greater, or more preferably 3 μm or greater.

In a preferable embodiment, the PSA sheet disclosed herein comprises, as the PSA layers, a first PSA layer provided to the first face of the substrate film and a second PSA layer provided to the second face of the substrate film. On the surface of at least one of the first and second PSA layers, the coating layer is partially placed. Such an adhesively double-faced PSA sheet is preferably used for fixing articles and parts.

In a preferable embodiment of the PSA sheet disclosed herein, the substrate film has a thickness less than 5 µm. The substrate having a limited thickness is advantageous in view of thinning of the PSA sheet and the PSA sheet having a substrate of such thickness can be preferably used for mobile electronic applications.

In a preferable embodiment of the PSA sheet disclosed herein, the PSA sheet has an overall thickness of 50 µm or less. In such a thin PSA sheet, the air release properties according to the art disclosed herein are well exhibited.

The present invention also provides a release liner-backed PSA sheet for use in mobile electronics, the release liner-backed PSA sheet comprising a PSA sheet disclosed herein and a release liner that protects an adhesive face of the PSA sheet. Of the surfaces of the release liner, the adhesive face-side surface is preferably formed smooth. In such an embodiment, greater adhesive properties tend to be obtained. According to the art disclosed herein, in this embodiment, when the release liner is used as a coating layer-transferring film, a good transfer of the coating layer can be obtained.

The present invention also provides a release liner for PSA sheets, the release liner comprising a releasable support having at least one releasable face. The releasable face of the releasable support is provided with a coating layer that can be transferred onto a PSA sheet. The coating layer has a thickness less than 3 µm. With the use of such a release liner to transfer the coating layer onto the PSA layer surface of the PSA sheet, a PSA sheet capable of achieving good air release properties can be provided.

The present invention also provides a method for producing a PSA sheet disclosed herein. The production method comprises a step of forming a PSA layer on a releasable surface of a releasable support and a step of transferring the PSA layer onto a surface of a substrate film. In a preferable embodiment, a coating layer is partially formed on the releasable surface of the releasable support; the step of forming the PSA layer is a step of forming a PSA layer further on the releasable surface that bears the coating layer formed. Alternatively, in another preferable embodiment, no coating layer is formed on the releasable surface of the releasable support. This embodiment includes, after the step of transferring the PSA layer, a step of removing the releasable support from the PSA layer. The method further comprises a step of obtaining a coating layer-bearing releasable support wherein a coating layer is partially formed on the releasable face, and a step of layering the coating layer bearing releasable support over the PSA layer so as to transfer the coating layer onto the adhesive face of the PSA sheet. This method is used to preferably obtain the PSA sheet disclosed herein (typically a PSA sheet having a coating layer thickness less than 3 µm, e.g. a PSA sheet whose substrate has a thickness up to a certain value). In a more preferable embodiment, a PSA sheet production method disclosed herein comprises a step of forming a coating layer partially on the releasable surface of the releasable support, a step of forming a PSA layer further on the releasable surface that bears the coating layer formed, and a step of transferring the PSA layer onto a surface of a substrate film. By the use of such a transferring method, the PSA sheet in an embodiment disclosed herein can be produced accurately and efficiently.

DESCRIPTION OF EMBODIMENTS

Figure 1:
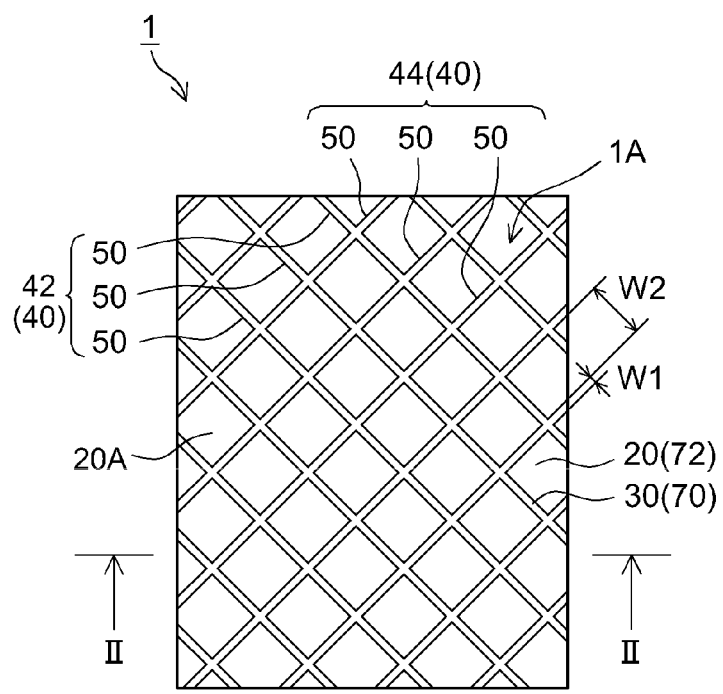
FIG. 1 shows a schematic top view of the PSA sheet according to an embodiment.

Preferred embodiments of the present invention are described below. Matters necessary to practice this invention other than those specifically referred to in this description may be comprehended by a person of ordinary skill in the art based on the instruction regarding implementations of the invention according to this description and the common technical knowledge in the pertinent field. The present invention can be practiced based on the contents disclosed in this description and common technical knowledge in the subject field. In the drawings referenced below, a common reference numeral may be assigned to members or sites producing the same effects, and duplicated descriptions are sometimes omitted or simplified. The embodiments described in the drawings are schematized for clear illustration of the present invention, and do not necessarily represent the accurate sizes or reduction scales of the PSA sheet of the present invention provided as an actual product.

The concept of PSA sheet herein encompasses so-called PSA tapes, PSA labels, and PSA films. The PSA sheet disclosed herein can be in a roll form or in a flat sheet form. Alternatively, the sheet may be further processed into various forms.

Figure 2:
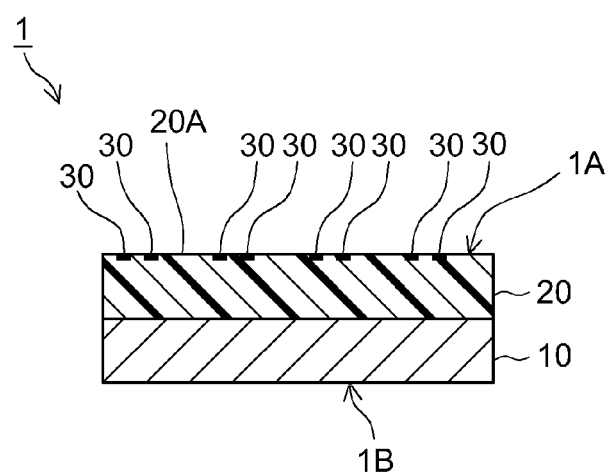
FIG. 2 shows a cross-sectional diagram at line II-II in FIG. 1.

FIG. 1 shows a schematic top view of the PSA sheet according to an embodiment. FIG. 2 shows a cross-sectional diagram at line II-II in FIG. 1. With reference to the drawings, the PSA sheet in this embodiment is described.

As shown in FIGS. 1 and 2, PSA sheet 1 according to this embodiment has a layered structure formed of a substrate film 10 and a PSA layer 20. Substrate film 10 supports the PSA layer 20. In PSA sheet 1, the surface 20A on the PSA layer 20 side forms an adhesive face 1A. The other face 1B (the surface on the film substrate 10 side) of PSA sheet 1 is a non-adhesive face.

On the surface 20A of the PSA layer 20, a coating layer 30 is partially placed. In other words, the PSA layer surface 20A is partially covered with the coating layer 30. When PSA sheet 1 is applied to an adherend, the coating layer 30 forms pathways for air and the like between the PSA sheet 1 and the adherend, whereby air release properties are provided.

The thickness of the coating layer 30 is designed to be less than 3 µm. By this, good air release properties are obtained and the adhesive face 1A of PSA sheet 1 is made smooth. In addition, it can exhibit good adhesive properties from an early stage after applied to an adherend. It also enhances the lamination and the appearance of the coating layer 30 on the PSA layer surface 20A. The coating layer preferably has a thickness of 2 μm or less (typically less than 2 μm). The coating layer 30 in this embodiment has a thickness of about 1.5 μm. The thickness of the coating layer can be obtained by SEM (scanning electron microscopy) or TEM (transmission electron microscopy) analysis of a cross section of the PSA sheet.

From the standpoint of the smoothness of the PSA sheet's adhesive face 1A and the lamination on the PSA layer 20, it is preferable that the thickness of the coating layer 30 is about equal to or less than the thickness of the PSA layer 20. In a preferable embodiment, the ratio ($T_C/T_A$) of the thickness $T_C$ of the coating layer 30 to the thickness $T_A$ of the PSA layer 20 is 0.75 or less, more preferably 0.70 or less, or yet more preferably 0.5 or less (e.g. 0.4 or less).

The coating layer 30 has a prescribed pattern (coating layer pattern) 40 on the adhesive face 1A of the PSA sheet 1. In this embodiment, the coating layer 30 is in a lattice pattern 40. In particular, the lattice pattern 40 of the coating layer 30 is formed of the first stripe pattern 42 and the second stripe pattern 44 that is placed to intersect the first stripe pattern 42.

The first stripe pattern 42 is formed of parts 50 (linearly extending parts, bands in this embodiment) that run straight from one edge to another edge of the adhesive face 1A. These linearly extending parts 50 are placed in parallel at intervals arranged in their width direction. In this embodiment, the linearly extending parts 50 are placed at an angle such that their length directions intersect the edges (ends, limits) of the width direction of PSA sheet 1, with each part reaching two edges (two sides) of the adhesive face 1A.

Similarly to the first stripe pattern 42, the second stripe pattern 44 is also formed of parts 50 (linearly extending parts, bands in this embodiment) that run straight from one edge to another edge of the adhesive face 1A. These linearly extending parts 50 are placed in parallel at intervals arranged in their width direction. In this embodiment, the linearly extending parts 50 are placed at an angle such that their length directions intersect the edges of the width direction of PSA sheet 1, with each part reaching two edges (two sides) of the adhesive face 1A. In this embodiment, the linearly extending parts 50 are straight bands, but are not limited thereto. Each linearly extending part may be curvilinear. In such an embodiment, the several linearly extending parts may form a wavy stripe pattern, etc. The number of the linearly extending parts (the number of lines) may depend on the shape, size, etc., of the adhesive face of the PSA sheet; and therefore, it is not limited to a particular number.

In this embodiment, the first stripe pattern 42 and the second stripe pattern 44 intersect each other so that the linearly extending parts 50 of the first stripe pattern 42 and the linearly extending parts 50 of the second stripe pattern 44 cross one another almost perpendicularly. Thus, the linearly extending parts 50 of the first stripe pattern 42 partially overlap the linearly extending parts 50 of the second stripe pattern 44.

Herein, the lattice pattern typically refers to a pattern that includes two stripe patterns intersecting each other and encompasses not only a rhombic lattice as in the present embodiment, but also various lattice shapes such as a square lattice and a triangular lattice. When the linearly extending parts are straight, the angle (the acute angle) at an intersection of the two stripe patterns can be in a range from 10° to 90° (preferably 45° to 90°, typically 60° to 90°). The lattice pattern disclosed herein also encompasses a pattern that includes a stripe pattern formed of several linearly extending parts with repeated bending, for instance, a pattern such as a hexagonal lattice. In such a pattern, adjacent linearly extending parts may be partially connected to one another. From the standpoint of the air release properties, the coating layer preferably comprises one, two or more stripe patterns. The coating layer pattern (typically a lattice pattern) may include a third stripe pattern.

Figure 3:
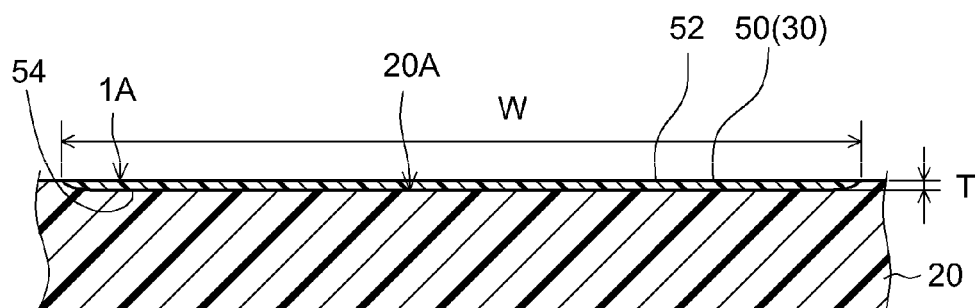
FIG. 3 shows a cross section of a linearly extending part (perpendicularly intersecting the length direction) of the coating layer according to a preferable embodiment in an enlarged schematic cross-sectional view.
Figure 4:
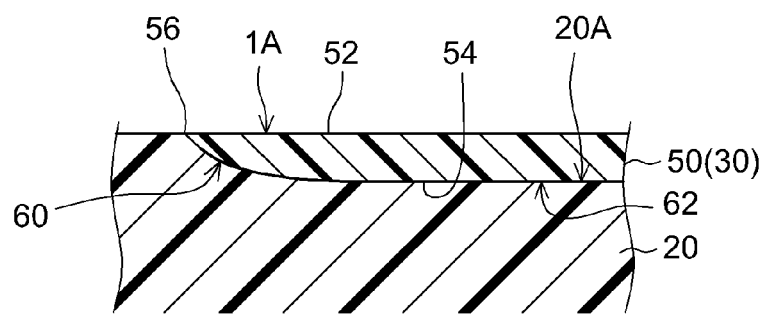
FIG. 4 shows the left edge of the coating layer in FIG. 3 in a further enlarged schematic cross-sectional view.
Figure 5:
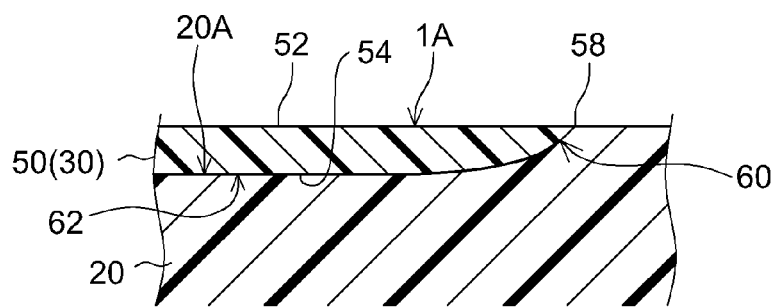
FIG. 5 shows the right edge of the coating layer in FIG. 3 in a further enlarged schematic cross-sectional view.

Described next is a preferable embodiment of the coating layer 30. FIG. 3 shows a cross section of a linearly extending part (the cross section perpendicularly intersecting the length direction) of the coating layer in an enlarged schematic cross-sectional view. FIG. 4 shows the left edge of the coating layer in FIG. 3 in a further enlarged schematic cross-sectional view. FIG. 5 shows the right edge of the coating layer in FIG. 3 in a further enlarged schematic cross-sectional view.

As shown in FIG. 3, a linearly extending part 50 of the coating layer 30 is in a thin layer laminated partially on the surface 20A of the PSA layer 20 and has a first face 52 that forms the adhesive face 1A of the PSA sheet 1 and a second face 54 located on the PSA layer 20 side relative to the first face 52. In particular, the surfaces of the linearly extending part 50 are formed with the first face 52 and the second face (inner surface) 54 as the back face of the first face (outer surface) 52.

The first face 52 of the linearly extending part 50 is flush with or protrudes slightly from the outer surface of the PSA layer 20. From the standpoint of the air release properties, it is preferable that the first face 52 of the linearly extending part 50 protrudes slightly from the outer surface of the PSA layer 20. The height of the protruding portion of the first face of the linearly extending part (the height relative to the outer surface of the PSA layer (precisely, relative to the imaginary flat surface formed with the outer surface of the PSA layer)) is preferably less than 30% (e.g. less than 10%) of the thickness of the linearly extending part. It is noted that the thickness of the linearly extending part is basically identical to the thickness of the coating layer.

The second face 54 of the linearly extending part 50 forms an overall gently curved line in a cross section that perpendicularly intersects the length direction of the linearly extending part 50. This can bring about good air release properties along with higher quality in the PSA sheet comprising a coating layer that partially covers the surface of the PSA layer 20. In particular, as shown in FIG. 4, in the cross section, the second face 54 of a linearly extending part 50 has a segment that starts from one edge 56 (the left edge in the drawing) of the linearly extending part 50 and runs towards the middle in a gently curved line while sinking in the depth direction (the thickness direction) of the PSA layer 20. Similarly, as shown in FIG. 5, the second face 54 of a linearly extending part 50 has a segment that starts from the other edge 58 (the right edge in the drawing) of the linearly extending part 50 and runs towards the middle in a gently curved line while sinking in the depth direction (the thickness direction) of the PSA layer 20. By this, the PSA fits well with the coating layer 30. The edges (the one edge 56 and the other edge 58) can basically form the adhesive face 1A of the PSA sheet 1, high quality of the edges leads to high quality of the adhesive face 1A. The one edge 56 and the other edge 58 correspond to the two edges of the width direction of the linearly extending part 50.

Herein, "forming an overall gently curved line" means that it draws an overall gently curved line which may partially include a straight line (e.g. at the bottom of the coating layer, etc.). It also means being entirely free of corners when observed at 10000× magnification (in particular, when observing an SEM or TEM cross-sectional image of a linearly extending part of the coating layer at 10000× magnification). In other words, it means being free of corners at the submicroscopic (0.1 μm) level and preferably being free of inflection points.

Herein, that it "starts from one edge of a linearly extending part and runs towards the middle in a gently curved line while sinking in the depth direction of the PSA layer" is not limited to a specific slope or curved shape. In typical, the concept includes having a gentle slope such that it always satisfies that, in a cross section perpendicularly intersecting the length direction of a linearly extending part 50, on the line segment of the second face 54 of the linearly extending part 50, at X μm towards the middle from one edge (the one edge 56 or the other edge 58) of the linearly extending part 50, the second face 54 has a depth less than $1/\sqrt{2}X$ μm (preferably less than $1/\sqrt{3}X$ μm, more preferably less than 1/2X μm, e.g. less than 1/3X μm). The depth of the second face 54 of the linearly extending part 50 refers to the depth of the second face 54 relative to the outer surface of the PSA layer 20 (precisely, relative to the imaginary flat surface formed with the outer surface of the PSA layer 20). X is a positive integer and its upper limit is a half the width of the linearly extending part 50. For instance, when a linearly extending part 50 of the coating layer 30 has a thickness less than 3 μm, at X in a range of 10 μm or less (more restrictedly in a range of 5 μm or less), on the line formed by the second face 54 of the linearly extending part 50, at X μm towards the middle from one edge of the linearly extending part 50, it is preferable that the second face 54 always has a depth less than $1/\sqrt{3}X$ μm (preferably less than 1/2X μm, more preferably less than 1/3X μm, e.g. less than 1/4X μm).

More specifically, the second face 54 of a linearly extending part 50 has an inclined segment 60 and a flat segment 62 that continues from the inclined segment 60. In the cross section, the inclined segment 60 has a shape that runs from the one edge 56 of the linearly extending part 50 in the depth direction of the PSA layer 20. The flat segment 62 of the second face 54 is a range that includes the deepest portion of the linearly extending part 50. In this embodiment, in the cross section, it runs mostly parallel to the adhesive face 1A of the PSA sheet 1.

In this embodiment, the inclined segment 60 is formed in an area running from the one edge 56 of the width direction of the linearly extending part 50 to about 10 μm towards the middle in the width direction, and an area running from the other edge 58 of the width direction of the linearly extending part 50 to about 10 μm towards the middle in the width direction. The rest of the second face 54 (i.e. the bottom of the coating layer 30) forms the flat segment 62. The inclined segment 60 is curved, convex on the PSA layer 20 side.

The range to which the inclined segment is formed is not limited to those described above. When a linearly extending part of the coating layer has a maximum depth of D μm, the inclined segment can be formed in a range that runs from one of the two edges of the width direction of the linearly extending part to 10·D μm (typically 7·D μm, e.g. 4·D μm) towards the middle in the width direction. For instance, when the linearly extending part of the coating layer has a maximum depth in a range of 0.5 μm to 2 μm, the inclined segment may be formed in a range that runs from one of the two edges of the width direction of the linearly extending part up to 20 μm (typically 14 μm, e.g. 8.0 μm) or up to 5.0 μm (typically 3.5 μm, e.g. 2.0 μm) towards the middle in the width direction. The depth of the linearly extending part is the depth of the second face of the linearly extending part, referring to the depth of the linearly extending part relative to the outer surface of the PSA layer (precisely, relative to the imaginary flat surface formed with the outer surface of the PSA layer). The same is true with the maximum depth (the depth of the deepest point).

From the one edge 56 or the other edge 58 of the width direction of the linearly extending part 50 up to at least about 1 μm (e.g. 2 μm, typically 3 μm) towards the middle in the width direction, the inclined segment 60 has a slope that can be confirmed in a cross-sectional image (e.g. an SEM cross-sectional image) at 10000× magnification (specifically, a slope that has, in the cross section, an angle of, for instance, 5° or greater, typically 10° or greater between the adhesive face 1A and the inclined segment 60). The slope of the inclined segment 60 is suitably in a range such that the angle between the adhesive face 1A and the inclined segment 60 in the cross section is about 60° or less (e.g. 45° or less, typically 30° or less).

In this embodiment, the maximum depth of the linearly extending parts 50 of the coating layer 30 is about 1.5 μm, but the maximum depth is not limited to this. The maximum depth of the linearly extending parts of the coating layer is preferably up to about a half (e.g. up to one-third, typically up to one-fifth) the thickness of the PSA layer. In particular, from the standpoint of the air release properties, the maximum depth of the linearly extending parts of the coating layer is preferably 0.1 μm or greater (e.g. 0.5 μm or greater, typically 1 μm or greater). The maximum depth is preferably 10 μm or less, or more preferably 5 μm or less (e.g. 3 μm or less, typically 2 μm or less). When the first face of the coating layer is almost flush with the outer surface of the PSA layer, the maximum depth of the linearly extending parts of the coating layer is about the same as the thickness of the coating layer. The maximum depth of a linearly extending part of the coating layer can be obtained by SEM or TEM analysis.

The coating layer disclosed herein is not limited to such a cross section. For instance, a linearly extending part of the coating layer may have a rectangular shape, a trapezoidal shape, a triangular shape, etc., in a cross section that perpendicularly intersects the length direction.

The width (W1) of each linearly extending part 50 of the coating layer 30 is about 200 μm in the present embodiment, but is not limited to this. In a preferable embodiment, the width (W1) of each linearly extending part of the coating layer is in a range of 0.1 mm to 2 mm. This can combine high long-term adhesive strength (adhesive strength after aged) and good air release properties. From the standpoint of enhancing the air release properties, the width (W1) of the linearly extending part is more preferably 0.2 mm or greater, yet more preferably 0.3 mm or greater, or particularly preferably 0.5 mm or greater. In another preferable embodiment, the width (W1) of each linearly extending part of the coating layer is about 10 μm or greater. From the standpoint of the air release properties, the width (W1) of each linearly extending part of the coating layer is preferably 50 μm or greater, more preferably 100 μm or greater, or yet more preferably 150 μm or greater. From the standpoint of the adhesive strength, the appearance, etc., the width (W1) of the linearly extending part is more preferably 1.2 mm or less, yet more preferably 1.0 mm or less, even more preferably 0.7 mm or less, particularly preferably 0.5 mm or less, or most preferably 0.4 mm or less. The width (W1) of a linearly extending part of the first stripe pattern can be equal to or different from the width (W1) of a linearly extending part of the second stripe pattern.

In a preferable embodiment, from the standpoint of the air release properties, a linearly extending part has a ratio (W/T) of its width W to its thickness T of about 50 or higher. The ratio (W/T) is more preferably about 80 or higher, or yet more preferably 100 or higher (typically 120 or higher). From the standpoint of the balance between air release properties and adhesion, the ratio (W/T) is preferably about 500 or lower (e.g. 200 or lower, typically 165 or lower).

The intervals (W2) between the linearly extending parts 50 forming the first stripe pattern 42 of the coating layer 30 are about 1.8 mm in this embodiment and the same applies to the intervals (W2) between the linearly extending parts 50 forming the second stripe pattern 44, but neither is limited to this. The intervals (W2) between the linearly extending parts forming the first stripe pattern are preferably in a range of 1.0 mm to 10 mm. By this, there is a higher tendency that high long-term adhesive strength is combined with air release properties in a well-balanced manner. Here, the intervals (W2) between the linearly extending parts refer to the widths of spaces present between any two adjacent linearly extending parts in the adhesive face of the PSA sheet. From the standpoint of increasing the long-term adhesive strength, etc., the intervals (W2) between the linearly extending parts are more preferably 1.5 mm or greater, or yet more preferably 2.5 mm or greater. The intervals (W2) between the linearly extending parts can be about 8 mm or less (e.g. 5 mm or less, typically 3 mm or less). The intervals (W2) between the linearly extending parts forming the second stripe pattern can also be preferably selected from the ranges exemplified for the intervals (W2) between the linearly extending parts forming the first stripe pattern. The intervals (W2) are preferably evenly spaced. The intervals (W2) between the linearly extending parts forming the first stripe pattern can be equal to or different from the intervals (W2) between the linearly extending parts forming the second stripe pattern.

From the standpoint of combining well-balanced high long-term adhesive strength and air release properties, the pitch of the linearly extending parts is preferably in a range of 1 mm to 20 mm. The pitch of the linearly extending parts is more preferably 1.5 mm or greater, yet more preferably 2 mm or greater (e.g. 2.5 mm or greater); it is more preferably 15 mm or less (e.g. 12 mm or less), or yet more preferably 5 mm or less. The pitch refers to the distance (interval) between the centerlines of the width directions (i.e. the lengthwise centerlines) of the linearly extending parts.

With focus on the surface 20A of the PSA layer 20, the embodiment above can be described such that the surface 20A of the PSA layer 20 has a coating layer-bearing area 70 where the coating layer 30 is placed and a coating layer-free area 72 where the PSA layer 20 is exposed on the outer surface without the coating layer 30. The features (shape, arrangement, relative position, size, etc.) of the coating layer bearing area 70 in the PSA layer surface 20A are the same with the features of the coating layer 30 in the adhesive face 1A of the PSA sheet 1. Thus, the coating layer bearing area 70 is in a pattern (a lattice pattern) that has the same features as the coating layer pattern 40 with a first stripe pattern having the same features as the first stripe pattern 42 and a second stripe pattern having the same features as the second stripe pattern 44. The first stripe pattern of the coating layer bearing area 70 has linearly extending parts that have the same features as the linearly extending parts 50 that the first stripe pattern 42 has. The second stripe pattern of the coating layer bearing area 70 has linearly extending parts that have the same features as the linearly extending parts 50 that the second stripe pattern 44 has. Thus, details of the features of the coating layer-bearing area 70 and the coating layer-free area 72 are omitted here.

Figure 6:
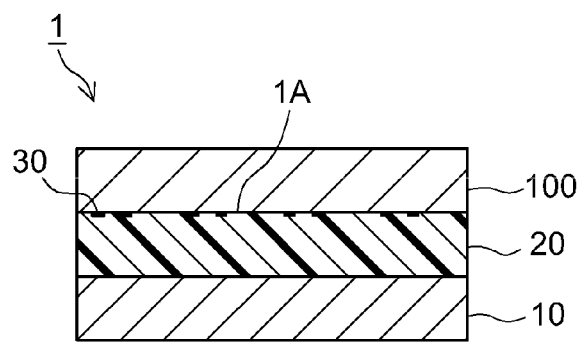
FIG. 6 shows a schematic cross-sectional diagram of the release liner-backed PSA sheet according to an embodiment.

Before used, as shown in FIG. 6, the PSA sheet 1 may be in a form of a release liner-backed PSA sheet 1 protected with a release liner 100 having a release face on the adhesive face 1A side. Alternatively, it may be in a form such that the back face (opposite from the PSA layer 20 side surface) of substrate film 10 is a release face and the PSA sheet 1 is wound so that the back face is brought into contact with the PSA layer 20 whereby the PSA layer 20 is protected with the back face of the substrate film. Such an adhesively single-faced PSA sheet (single-faced PSA sheet) having only one adhesive face is favorable, for instance, when the surface opposite from the adhesive face requires features such as decoration and surface protection, or when it is used as a paint substitute sheet.

Figure 7:
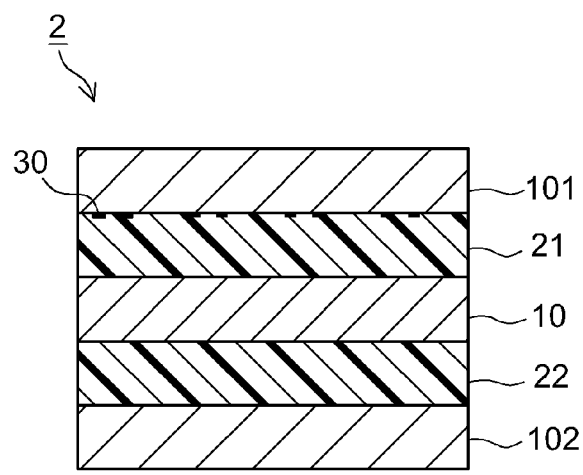
FIG. 7 shows a schematic cross-sectional diagram of the release liner-backed PSA sheet according to another embodiment.

When the PSA sheet disclosed herein is an adhesively double-faced substrate-backed PSA sheet (a double-faced PSA sheet) as shown in FIG. 7, the PSA sheet 2 may be in an embodiment such that the respective faces (both non-releasable) of substrate film 10 are provided with PSA layers 21 and 22 with the PSA layers 21 and 22 protected with release liners 101 and 102, respectively, with each liner having a release face at least on the PSA layer side. In the PSA sheet 2, a coating layer 30 is partially placed only on the surface of the PSA layer 21, and no coating layer is formed on the PSA layer 22. Alternatively, although not specifically shown in a drawing, the double-faced PSA sheet may be in an embodiment such that PSA layers are provided to the respective faces (both non-releasable) of the substrate film and one of the PSA layers is protected with a release liner having a release face on each side. By winding the PSA sheet so that the other PSA layer is brought into contact with the back face of the release liner, this type of PSA sheet can be made into an embodiment where the two PSA layers are protected with the one release liner. The double-faced PSA sheet is preferably used, for instance, for bonding/fixing applications.

<Properties of PSA Sheet, Etc.>

In the PSA sheet disclosed herein, the % surface area of the coating layer free area in the PSA layer surface (which can be the % surface area of the coating layer in the adhesive face of the PSA sheet) is preferably 70% or higher. This can ensure high long-term adhesive strength. The % surface area is more preferably 75% or higher, or yet more preferably 80% or higher; from the standpoint of obtaining good air release properties, the % surface area is preferably 90% or lower, or more preferably 85% or lower.

In a preferable embodiment, the adhesive face (typically formed of the outer surface of the PSA layer and the coating layer surface) of the PSA sheet shows a 24-hour adhesive strength (adhesive strength after 24-hour adhesion) of 2 N/20 mm or greater (preferably 5 N/20 mm or greater, or more preferably 8 N/20 mm or greater). The 24-hour adhesive strength can be determined by the method described next. In particular, the PSA sheet is cut to a 20 mm wide by 100 mm long size to obtain a measurement sample; and in an environment at 23° C. and 50% RH, the adhesive face of the measurement sample is press-bonded to the surface of a stainless steel plate (SUS 304BA plate) with a 2 kg roller moved back and forth once. This is left standing in the same environment for 24 hours. Subsequently, using a universal tensile/compression tester, based on JIS Z 0237:2000, the peel strength (N/20 mm) is determined at a tensile speed of 300 mm/min at a peel angle of 180°. More specifically, it is measured by the method described later in Examples.

In a preferable embodiment, the PSA sheet has transparency (including semi-transparency). In such a PSA sheet, when bubbles and the like are trapped between the PSA sheet and an adherend, they are visible through the PSA sheet and are likely to degrade the appearance. The art disclosed herein prevents formation of the sort of bubbles between the PSA sheet and the adherend; and therefore, an excellent appearance can be obtained in a transparent PSA sheet. That the PSA sheet is transparent means that the components (PSA layer, substrate film and coating layer) of the PSA sheet are transparent. Herein, that the PSA sheet and its components (PSA layer, substrate film and coating layer) are transparent may mean that the PSA sheet and its components show a total light transmittance of 80% or higher (e.g. 90% or higher, typically 95% or higher). The PSA sheet preferably has a haze value of 10% or lower (e.g. 5% or lower). The total light transmittance and the haze value can be determined using a commercial transmissometer (e.g. product name HAZE METER HM-150 available from Murakami Color Research Laboratory). The total light transmittance and the haze value of the substrate film described later are also determined by the same methods.

The overall thickness of the PSA sheet disclosed herein (including the PSA layer and the substrate, but excluding the release liner) is not particularly limited. It is suitably in a range of about 2 µm to 1000 µm, or preferably 5 µm to 500 µm (e.g. 10 µm to 300 µm, typically 30 µm to 100 µm). In a preferable embodiment, the PSA sheet has an overall thickness of 50 µm or less, or more preferably 30 µm or less (e.g. 15 µm or less, typically 5 µm or less). According to the art disclosed herein, good air release properties can be obtained even when the PSA sheet is limited in overall thickness as described above. The PSA sheet limited in overall thickness can be advantageous in view of making products to which the PSA sheet is applied smaller, lighter, resource-saving, and so on.

The tolerance for thickness of the PSA sheet disclosed herein is preferably 50% or less. The PSA sheet with a small tolerance for thickness can exhibit greater adhesive properties. The tolerance for thickness is more preferably 40% or less, yet more preferably 30% or less, or particularly preferably 20% or less. The tolerance for thickness of the PSA sheet is determined by the method described later in Examples.

<Substrate Film>

Examples of the substrate film disclosed herein include resin film, paper, cloth, rubber film, foam film, and metal foil as well as a composite and a laminate of these. In particular, from the standpoint of the ease of application and the appearance, it preferably comprises a resin film layer. The inclusion of the resin film layer is advantageous also from the standpoint of the size stability, the accuracy of thickness, the ease of processing, the tensile strength and so on. Examples of the resin film include polyolefinic resin film such as polyethylene (PE), polypropylene (PP), and ethylene/polypropylene copolymers; polyester-based resin film such as polyethylene terephthalate (PET), polybutylene terephthalate, and polyethylene naphthalate; vinyl chloride-based resin film; vinyl acetate-based resin film; polyimide-based resin film; polyamide-based resin film; fluororesin film; and cellophane. Favorable examples include resin films formed from PE, PP and PET. Among the resin films, polyester film is more preferable; among them, PET film is even more preferable. The substrate film may have a mono-layer structure or a multilayer structure formed of two, three or more layers.

In a preferable embodiment, the substrate film is a substrate comprising a foam film (a foam-containing substrate). This provides impact-absorbing capabilities to the PSA sheet. Here, the foam film refers to a film structure having a part with foam cells (a foam cell structure). The foam-containing substrate may be a mono-layer structure formed from a foam film or a multi-layer structure wherein at least one of whose two or more layers is formed of a foam film (a foam layer). A configurational example of the foam-containing substrate is a composite substrate in which a foam film (a foam layer) and a non-foamed film (a non-foamed layer) are laminated. The non-foamed film (non-foamed layer) refers to a film structure that has not been subjected to a purposeful foaming process (e.g. a process to incorporate foam cells), referring to a film essentially free of a foam cell structure. A typical example of the foam film is a resin film (e.g. a polyester-based resin film such as of PET) having an expansion rate of less than 1.1-fold (e.g. less than 1.05-fold, typically less than 1.01-fold). When the substrate film comprises two or more foam layers, the materials and structures of these foam layers can be identical or different. When the foam film has a multi-layer structure that includes a foam layer, from the standpoint of increasing the tightness between layers, adhesive layers may be placed between the layers.

The foam film is not particularly limited in average foam cell diameter; it is usually suitably 10 µm to 200 µm, preferably 20 µm to 180 µm, or more preferably 30 µm to 150 µm. When the average foam cell diameter is 10 µm or larger, the impact-absorbing properties tend to increase. On the other hand, when the average foam cell diameter is 200 µm or smaller, the handling properties and waterproof properties (water-blocking properties) tend to increase.

The average foam cell diameter (µm) of the foam film can be determined, using a low-vacuum scanning electron microscope to take an enlarged image of a cross section of the foam and subjecting it to image analysis. About 20 to 30 foam cells can be analyzed. As the low-vacuum scanning electron microscope, for instance, product name S-3400N Scanning Electron Microscope available from Hitachi High-Tech Science Systems Corporation) can be used.

The foam film is not particularly limited in density (apparent density); it is usually suitably 0.01 g/cm$^3$ or higher, preferably 0.01 g/cm$^3$ to 0.7 g/cm$^3$, or more preferably 0.02 g/cm$^3$ to 0.5 g/cm$^3$. When the density is 0.01 g/cm$^3$ or higher, the strength of the foam film (and even that of the PSA sheet) will increase with a tendency toward greater impact resistance and handling properties. On the other hand, when the density is 0.7 g/cm$^3$ or lower, the conformability to a difference in level tends to increase without an excessive decrease in flexibility.

The density (apparent density) of the foam film is determined based on the method described in JIS K 7222:1999. In particular, the foam film is punched out into a 100 mm by 100 mm size to prepare a specimen and the dimensions of the specimen are measured. Using a ¹⁄₁₀₀ dial gauge with a 20 mm diameter measurement terminal, the thickness of the specimen is measured. From these values, the volume of the foam film specimen is determined. The specimen is weighed on a top-loading balance (minimum scale 0.01 g or greater). From these values, the apparent density (g/cm$^3$) of the foam film can be determined.

The 50% compressive stress of the foam film is not particularly limited. From the standpoint of the impact resistance, the foam film suitably shows a 50% compressive stress of 0.1 N/cm$^2$ or greater. When the 50% compressive stress is at or above a certain value, for instance, even if the foam film is thin (e.g. about 100 μm thick), it can show sufficient resistance when compressed (resilience to compression) and maintain good impact resistance. The 50% compressive stress is preferably 0.2 N/cm² or greater, or more preferably 0.5 N/cm² or greater. From the standpoint of combining flexibility and impact resistance in a well-balanced way, the 50% compressive stress is suitably 8 N/cm² or less, preferably 6 N/cm² or less, or more preferably 3 N/cm² or less.

The 50% compressive stress (hardness) of the foam film is determined based on JIS K 6767:1999. In particular, the foam film is cut to 100 mm by 100 mm pieces. These pieces are layered to a total thickness of at least 2 mm and the resultant is used as a measurement sample. At room temperature, using a compression tester, the measurement sample is compressed at a rate of 10 mm/min. When compressed to 50% (when compressed to 50% of its initial thickness) and held at 50% compression for 10 seconds, the value (resilience in N/cm²) is recorded as the 50% compressive stress. Other conditions (e.g. jig and calculation method, etc.) are conformed to JIS K 6767:1999.

The foam constituting the foam film disclosed herein is not particularly limited in foam cell structure. The foam cell structure can be a continuous foam cell structure, an isolated foam cell structure, or a semi-continuous foam cell structure. From the standpoint of the impact absorbing properties, continuous and semi-continuous foam cell structures are preferable.

The material of the foam film is not particularly limited. The foam film can be typically formed from a material comprising a polymer component (e.g. a thermoplastic polymer). A preferable foam film is usually formed of foam of a plastic material (plastic foam). The plastic material (which means to include a rubber material) for forming the plastic foam is not particularly limited; a suitable species can be selected among known plastic materials. For the plastic material (typically a thermoplastic polymer), solely one species or a combination of two or more species can be used. The primary component (typically a component accounting for more than 50% by weight) among the polymers in the substrate film or the foam film may be referred to as the "base polymer" hereinafter.

Specific examples of the foam include polyolefinic resin foam such as PE foam and PP foam; polyester-based foam such as PET foam, polyethylene naphthalate foam and polybutylene terephthalate foam; polyvinyl chloride-based resin foam such as polyvinyl chloride foam; vinyl acetate-based foam; acrylic resin foam; polyphenylene sulfide resin foam; amide-based resin foam such as polyamide (nylon) resin foam and all-aromatic polyamide (aramide) resin foam; polyimide-based resin foam; polyether ether ketone (PEEK) foam; styrene-based resin foam such as polystyrene foam; and urethane-based resin foam such as polyurethane resin foam. As the foam, rubber-based resin foam such as polychloroprene rubber foam can be used as well.

In a preferable embodiment, acrylic resin foam (foam formed from acrylic resin) is used as the foam. Here, the acrylic resin foam refers to foam comprising an acrylic polymer as the base polymer. The acrylic polymer in this description is as defined later. As the alkyl (meth)acrylate forming the acrylic polymer, one, two or more species can be preferably used among alkyl (meth)acrylates having acyclic alkyl groups with 1 to 20 (preferably 1 to 8, typically 1 to 4) carbon atoms. Preferable examples of the alkyl (meth)acrylate include ethyl acrylate, n-butyl acrylate and 2-ethylhexyl acrylate. The amount of the alkyl (meth)acrylate as the primary monomer is suitably 70% by weight or more of all monomers in the acrylic polymer, or preferably 75% by weight or more (e.g. 80% by weight or more). The amount of the alkyl (meth)acrylate is suitably 98% by weight or less of all the monomers, or preferably 97% by weight or less (e.g. 96% by weight or less).

The secondary monomer co-polymerizable with the alkyl (meth)acrylate as the primary monomer may be useful in introducing crosslinking points in the acrylic polymer or in increasing the cohesive strength of the acrylic polymer. As the secondary monomer, one, two or more species of functional group-containing monomers can be used among, for instance, carboxy group-containing monomers, hydroxy group-containing monomers, acid anhydride group-containing monomers, amide group-containing monomers, amino group-containing monomers, cyano group-containing monomers, monomers having nitrogen atom-containing rings and the like. The secondary monomer can also be a vinyl ester-based monomer such as vinyl acetate, an aromatic vinyl compound such as styrene, a sulfonate group-containing monomer, a phosphate group-containing monomer and the like. The amount of the secondary monomer is suitably 0.5% by weight or more of all monomers in the acrylic polymer, or preferably 1% by weight or more. The amount of the secondary monomer is suitably 30% by weight or less of all the monomers, or preferably 10% by weight or less.

When the foam is formed with an emulsion-based resin composition by a foaming method where gases including air are mixed in mechanically such as by stirring, it is preferable that the monomers forming the acrylic polymer comprise a nitrogen atom-containing monomer as the secondary monomer. This facilitates the formation of foam cells in the foaming process and may increase the viscosity of the composition when forming the foam (typically when drying the resin composition), whereby the foam cells are readily kept in the foam body.

Examples of the nitrogen atom-containing monomer include cyano group-containing monomers such as acrylonitrile and methacrylonitrile; lactam ring-containing monomers such as N-vinyl-2-pyrolidone; amide group-containing monomers such as (meth)acrylamide, N-hydroxyethyl (meth)acrylamide, N-methylolacrylamide, N,N-dimethylacrylamide, N,N-diethylacrylamide and diacetone acrylamide. These can be used solely as one species or in a combination of two or more species. Among them, cyano group-containing monomers such as acrylonitrile and lactam ring-containing monomers such as N-vinyl-2-pyrolidone are preferable.

The amount of the nitrogen atom-containing monomer is suitably 2% by weight or more of all monomers in the acrylic polymer, or preferably 3% by weight or more (e.g. 4% by weight or more). The amount of the nitrogen atom-containing monomer is suitably 30% by weight or less of all the monomers, or preferably 25% by weight or less (e.g. 20% by weight or less).

The method for obtaining the acrylic polymer is not particularly limited. Various polymerization methods known as procedures for the synthesis of acrylic polymer can be suitably used, such as solution polymerization, emulsion polymerization, bulk polymerization, suspension polymerization, active energy ray polymerization (e.g. UV polymerization). For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator. In view of the ease of foaming and environmental aspects, it is preferable to use acrylic resin foam (emulsion-based acrylic resin foam) obtained by emulsion polymerization.

From the standpoint of increasing the cohesive strength, the acrylic resin foam-forming composition preferably comprises a crosslinking agent. The type of crosslinking agent is not particularly limited. Among various crosslinking agents, one, two or more species can be suitably selected and used. Favorable examples of the crosslinking agent include isocyanate-based crosslinking agents, epoxy-based crosslinking agents, oxazoline-based crosslinking agents, carbodiimide-based crosslinking agents, melamine-based crosslinking agents and metal oxide-based crosslinking agents. In particular, oxazoline-based crosslinking agents are preferable. The amount of the crosslinking agent used is not particularly limited. To 100 parts by weight of the acrylic polymer, it is suitably selected from a range of about 10 parts by weight or less (e.g. about 0.005 part to 10 parts by weight, preferably about 0.01 part to 5 parts by weight).

In another preferable embodiment, polyolefinic resin foam (resin foam formed from a polyolefin) is used as the foam. As the plastic material forming the polyolefinic foam, various known or commonly-used polyolefinic resins can be used without particular limitations. Examples include polyethylene such as low density polyethylene (LDPE), linear low density polyethylene (LLDPE), high density polyethylene (HDPE) and metallocene catalyst-based linear low density polyethylene; polypropylene; ethylene-propylene copolymer; and ethylene-vinyl acetate copolymer. Among these polyolefinic resins, solely one species or a combination of two or more species can be used.

From the standpoint of the impact resistance, waterproof properties, etc., favorable examples of the foam film in the art disclosed herein include a polyethylene-based foam film essentially formed of polyethylene-based resin foam and a polypropylene-based foam film essentially formed of polypropylene-based resin foam. Here, the polyethylene-based resin refers to resin formed from ethylene as the primary monomer (i.e. the primary component among the monomers) and may include HDPE, LDPE and LLDPE as well as ethylene-propylene and ethylene-vinyl acetate copolymers of which ethylene is copolymerized at a ratio above 50% by weight. Similarly, the polypropylene-based resin refers to resin formed from propylene as the primary monomer. As the foam film in the art disclosed herein, a polypropylene-based foam film can be preferably used.

The foaming method for the foam film is not particularly limited. In accordance with the purpose, ease of procedures, etc., chemical procedures, physical procedures and so on can be employed individually or in combination. From the standpoint of the contamination, etc., physical foaming methods are preferable. Specific examples include a foaming method where a film-forming material is prepared to contain a foaming agent such as a low boiling compound (e.g. a hydrocarbon) and thermally expandable microspheres and foam cells are formed from the foaming agent, a foaming method where gases such as air are mechanically mixed in, a foaming method by solvent removal which takes advantage of removal of a solvent such as water, and a foaming method using a supercritical fluid. For instance, a method where an inert gas (e.g. carbon dioxide) is injected into the foam film-forming polymer under increased pressure and the resultant is placed under reduced pressure to form a foam film. By this method, the average foam cell diameter can be easily controlled to be at or below a certain value and the foam film can be easily made to have a lower density.

The foam film is fabricated by employing a foaming method as described above. The formation of the foam film is not particularly limited. For instance, when employing a foaming method that mechanically admixes gases such as air, a resin composition (e.g. an emulsion-based resin composition) containing foam can be subsequently applied over a substrate or release paper, etc., and allowed to dry to obtain a foam film. From the standpoint of the foam stability, etc., the drying preferably includes a preliminary drying step at or above 50° C., but below 125° C. as well as a main drying step at 125° C. to 200° C. Alternatively, foam can be formed continuously into a film using a calender, extruder, conveyer belt casting and so forth; or a method where a kneaded mixture of foam-forming materials is foamed and molded in a batch process can be employed. In forming the foam film, a surface layer may be removed by slicing to adjust the film to obtain desirable thickness and foam characteristics.

The thermoplastic polymer (e.g. a polyolefinic polymer) that can be included in the foam film may comprise a thermoplastic elastomer that exhibits properties of rubber at room temperature, but shows thermoplasticity at a high temperature. From the standpoint of the flexibility and conformability, one, two or more species can be used among thermoplastic elastomers, for instance, olefinic elastomers such as ethylene-propylene copolymer, ethylene-propylene-diene copolymer, ethylene-vinyl acetate copolymer, polybutene, polyisobutylene, and chlorinated polyethylene; styrene-based elastomers such as styrene-butadiene-styrene copolymer; thermoplastic polyester-based elastomers; thermoplastic polyurethane-based elastomers; and thermoplastic acrylic elastomers. Among them, a thermoplastic elastomer having a glass transition temperature of room temperature or lower (e.g. 20° C. or lower). The thermoplastic elastomer content in the foam film is preferably about 10% to 90% by weight (e.g. 20% to 80% by weight) of the thermoplastic polymer in the foam film.

From the standpoint of the ease of mixing a foam-forming gas and the foam stability, as the foaming agent, various surfactants can be used in the foam film-forming material (e.g. an emulsion-based acrylic resin composition), with examples including anionic surfactants, cationic surfactants, nonionic surfactants and amphoteric surfactants. Hydrocarbon-based and fluorine-based surfactants can be used as well. In particular, from the standpoint of reducing the foam cell diameters and stabilizing the foam, anionic surfactants are preferable; ammonium salts of fatty acids (typically ammonium salts of higher fatty acids) such as ammonium stearate are more preferable. For the surfactant, solely one species or a combination of two or more species can be used. The surfactant content is preferably about 0.1 part to 10 parts by weight (e.g. 0.5 part to 8 parts by weight) to 100 parts by weight of the base polymer of the foam film. The foaming agent in this description includes not only an agent that shows foaming capabilities, but also a foam cell diameter-adjusting agent to reduce the foam diameters as well as a foam stabilizer such as a foam-adjusting agent.

When the foam film-forming material is an aqueous dispersion (e.g. an acrylic emulsion), it is preferable to use a silicone-based compound as the foaming agent. By this, the recovery of thickness (the degree and speed of recovery) after compression tends to improve. A preferable silicone-based compound has 2000 or fewer siloxane bonds. Examples of the silicone-based compound include silicone oil, modified silicone oil, and silicone resin. In particular, dimethyl silicone oil and methyl phenyl silicone oil are preferable. As the silicone-based compound, a silicone-modified polymer (e.g. a silicone-modified acrylic polymer, a silicone-modified urethane-based polymer, etc.) can be used as well. These can be used solely as one species or in a combination of two or more species. The silicone compound content is preferably about 0.01 part to 5 parts by weight (e.g. 0.05 part to 4 parts by weight, typically 0.1 part to 3 parts by weight) to 100 parts by weight of the base polymer of the foam film.

From the standpoint of stabilizing the foam and increasing the ease of film formation, the foam film-forming material (e.g. an emulsion-based acrylic resin composition) may comprise a thickener. The thickener is not particularly limited. Examples include acrylic acid-based thickeners, urethane-based thickeners and polyvinyl alcohol-based thickeners. In particular, polyacrylic acid-based thickeners and urethane-based thickeners are preferable. The thickener content is preferably about 0.1 part to 10 parts by weight (e.g. 0.1 part to 5 parts by weight) to 100 parts by weight of the base polymer of the foam film.

When a foam-containing substrate is used as the substrate film, the foam film preferably comprises a foam-nucleating agent such as a metal hydroxide (e.g. magnesium hydroxide). This tends to facilitate the adjustment of the average foam cell diameter in the foam film to obtain desirable impact-absorbing properties, flexibility and so on. The foam-nucleating agent can be a metal oxide, composite oxide, metal carbonate, metal sulfate, etc. The foam-nucleating agent content is preferably about 0.5 part to 125 parts by weight (e.g. 1 part to 120 parts by weight) to 100 parts by weight of the base polymer of the foam film.

When using a foam-containing substrate as the substrate film, from the standpoint of inhibiting the foam from degassing while foam cells are being formed, the foam film preferably comprises a degassing inhibitor such as fatty acid amides. A more preferable fatty acid amide has a bis-amide structure. The degassing inhibitor can be a metal salt of a fatty acid as well. The degassing inhibitor content is preferably about 0.5 part to 10 parts by weight (e.g. 0.7 part to 8 parts by weight, typically 1 part to 6 parts by weight) to 100 parts by weight of the base polymer of the foam film.

The substrate film (e.g. a foam film) may comprise a softener so as to provide desirable fluidity to the film-forming material thereby to improve properties such as flexibility. With the inclusion of a softener in the foam film, properties such as ease of stretching the film and expansion ratio can be preferably adjusted. For example, one, two or more species can be preferably used among hydrocarbon-based softeners such as liquid paraffin, paraffin wax, micro wax and polyethylene wax; ester-based softeners such as glyceryl stearate; and fatty acid-based softeners. The softener content is preferably 0.5 part to 50 parts by weight (e.g. 0.8 part to 40 parts by weight, typically 1 part to 30 parts by weight) to 100 parts by weight of the base polymer of the substrate film (e.g. a foam film).

When emulsion-based acrylic resin foam is used, an arbitrary anticorrosive may be included to prevent corrosion of metal parts adjacent to the foam film. As the anticorrosive, an azole ring-containing compound is preferable. With the use of an azole ring-containing compound, inhibition of metal corrosion and tight adhesion to adherends can be combined at a high level. In particular, a compound with the azole ring forming a fused ring with an aromatic ring such as a benzene ring is preferable; benzotriazole-based compounds and benzothiazole-based compounds are especially preferable. The anticorrosive content is preferably about 0.2 part to 5 parts by weight (e.g. 0.3 part to 2 parts by weight) to 100 parts by weight of the base polymer of the foam film.

In a preferable embodiment, the substrate film has transparency (including semi-transparency). In the PSA sheet comprising such a substrate film, when bubbles and the like are trapped between the PSA sheet and an adherend, they are visible through the PSA sheet and are likely to degrade the appearance. The art disclosed herein prevents formation of the sort of bubbles between the PSA sheet and the adherend; and therefore, an excellent appearance can be obtained in an embodiment comprising a transparent substrate. In particular, the substrate film may show a total light transmittance of 80% or higher (e.g. 90% or higher, typically 95% or higher). The substrate film preferably has a haze value of 10% or lower (e.g. 5% or lower).

To obtain desirable designs and optical properties, the substrate film (e.g. a resin film) may be colored black, white or other with various types of colorant (e.g. pigment) content. As a black colorant, carbon black is preferable. It is also possible to employ a method where at least one surface (one or each face) of the substrate film is subjected to printing to overlay one, two or more colored layers (e.g. a black layer and a white layer).

To the substrate film (e.g. a resin substrate film, a foam substrate film), various additives may be added as necessary, such as filler (inorganic filler, organic filler, etc.), anti-aging agent, antioxidant, UV ray absorber, antistatic agent, slip agent and plasticizer.

When the PSA sheet is adhesive on one face, between the two surfaces of the substrate film, the surface (back face) opposite from the surface to be provided with a PSA layer is preferably made smooth. The smooth surface may be the outer face of the PSA sheet; and therefore, when the PSA sheet having the smooth surface is used as, for instance, a decorative sheet or a surface protection sheet, it may provide a better appearance (design). In a preferable embodiment, from the standpoint of the adhesive properties and the quality of appearance (design), the back face of the substrate film may have an arithmetic mean surface roughness of 1 µm or less (e.g. about 0.05 µm to 0.75 µm, typically about 0.1 µm to 0.5 µm). In this description, the arithmetic mean surface roughness can be measured using a general surface roughness gauge (e.g. non-contact three-dimensional surface profilometer under model name WYKO NT-3300 available from Veeco).

When an adhesively single-faced PSA sheet is wound to bring the back face of the substrate film in contact with the PSA layer surface, the back face (opposite from the surface to be provided with a PSA layer) of the substrate film may be subjected as necessary to release treatment with a silicone-based, long chain alkyl-based, fluorine-based release agent or the like. The release treatment brings about effects such as easier unwinding of the PSA sheet wound in a roll. On the other hand, the PSA layer-side surface of the substrate film may be subjected to a heretofore known surface treatment such as corona discharge treatment and primer coating for purposes such as increasing the tightness of adhesion between the substrate and the PSA layer.

The thickness of the substrate film is not particularly limited and can be suitably selected in accordance with the purpose. In general, the substrate thickness is suitably 1 µm or larger (e.g. about 2 µm to 500 µm), or preferably about 5 µm to 500 µm (e.g. 10 µm to 200 µm, typically 15 µm to 100 µm). In a preferable embodiment, the thickness of the substrate film is about 30 µm or smaller, more preferably 12 µm or smaller, or yet more preferably smaller than 10 µm (e.g. smaller than 5 µm, typically smaller than 3 µm). It is advantageous to limit the thickness of the substrate film in view of making the PSA sheet thinner, smaller, lighter, resources-saving, and so on.

When the substrate film comprises a foam film, the thickness of the foam-containing substrate (e.g. a foam substrate film) can be suitably selected in accordance with the strength and flexibility of the PSA sheet, intended purposes and so on. From the standpoint of the impact-absorbing properties, etc., the foam-containing substrate has a thickness of suitably 30 µm or larger, preferably 50 µm or larger, or more preferably 60 µm or larger (e.g. 80 µm or larger). From the standpoint of making the PSA sheet thinner, smaller, lighter, resource-saving, and so on, the thickness of the foam-containing substrate is usually suitably 1 mm or smaller. The use of the foam film disclosed herein can bring about excellent impact-absorbing capabilities even when the thickness is about 350 µm or smaller (more preferably 250 µm or smaller, e.g. 180 µm or smaller). The thickness of the foam film (possibly a foam layer) in the foam-containing substrate can also be preferably selected from the ranges exemplified as the thickness of the aforementioned foam-containing substrate.

<PSA Layer>

The PSA layer disclosed herein typically refers to a layer formed of a material (PSA) that exists as a soft solid (a viscoelastic material) in a room temperature range and has a property to adhere easily to adherend with some pressure applied. As defined in "*Adhesion Fundamental and Practice*" by C. A. Dahlquist (McLaren & Sons (1966), P. 143), the PSA referred to herein is generally a material that has a property satisfying complex tensile modulus $E^*$ (1 Hz)$<10^7$ dyne/cm$^2$ (typically, a material that exhibits the described characteristics at 25° C.).

The PSA layer disclosed herein may comprise, as its base polymer, one, two or more species among acrylic polymers, rubber-based polymers, polyester-based polymers, urethane-based polymers, polyether-based polymers, silicone-based polymers, polyamide-based polymers, fluorine-based polymers, etc. From the standpoint of the adhesive properties (e.g. peel strength, repulsion resistance), molecular design, etc., acrylic polymers can be preferably used. In other words, the PSA layer is preferably an acrylic PSA layer that comprises an acrylic polymer as its base polymer. The "base polymer" of a PSA refers to the primary component (typically, a component accounting for more than 50% by weight) among polymers in the PSA.

As the acrylic polymer, for example, a polymer of a monomeric starting material comprising an alkyl (meth) acrylate as a primary monomer and possibly comprising a secondary monomer copolymerizable with the primary monomer is preferable. The primary monomer herein refers to a component that accounts for higher than 50% by weight of the monomer composition in the monomeric starting material.

As the alkyl (meth)acrylate, for instance, a compound represented by the following formula (1) can preferably be used:

$$CH_2=C(R^1)COOR^2 \qquad (1)$$

Herein, $R^1$ in the formula (1) is a hydrogen atom or a methyl group. $R^2$ is a acyclic alkyl group having 1 to 20 carbon atoms (hereinafter, such a numerical range of carbon atoms may be indicated as "$C_{1-20}$"). From the standpoint of the storage elastic modulus of the PSA, etc., an alkyl (meth)acrylate having a $C_{1-12}$ (e.g. $C_{2-10}$, typically $C_{4-8}$) acyclic alkyl group for $R^2$ is preferable. For the alkyl (meth)acrylate having a $C_{1-20}$ acyclic alkyl group for $R^2$, solely one species or a combination of two or more species can be used. Preferable alkyl (meth)acrylates include n-butyl acrylate and 2-ethylhexyl acrylate.

The secondary monomer copolymerizable with the alkyl (meth)acrylate as the primary monomer may be useful in introducing crosslinking points into the acrylic polymer and increasing the cohesive strength of the acrylic polymer. As the secondary monomer, one, two or more species can be used among functional group-containing monomers such as carboxy group-containing monomers, hydroxy group-containing monomers, acid anhydride group-containing monomers, amide group-containing monomers, amino group-containing monomers, and monomers having nitrogen-containing rings. The secondary monomer may also be a vinyl ester-based monomer such as vinyl acetate, an aromatic vinyl compound such as styrene, a sulfonate group-containing monomer, a phosphate group-containing monomer, etc. For instance, from the standpoint of increasing the cohesive strength, an acrylic polymer in which a carboxy group-containing monomer or a hydroxy group-containing monomer is copolymerized as the secondary monomer is preferable. Preferable examples of the carboxy group-containing monomer include acrylic acid and methacrylic acid. Preferable examples of the hydroxy group-containing monomer include 2-hydroxyethyl acrylate and 4-hydroxybutyl acrylate.

The amount of the secondary monomer is suitably 0.5% by weight of all monomers in the acrylic polymer, or preferably 1% by weight or more. The amount of the secondary monomer is suitably 30% by weight or less of all the monomers, or preferably 10% by weight or less (e.g. 5% by weight or less). When a carboxy group-containing monomer is copolymerized in the acrylic polymer, from the standpoint of combining adhesive strength and cohesive strength, the carboxy group-containing monomer content is preferably within a range of about 0.1% to 10% by weight (e.g. 0.2% to 8% by weight, typically 0.5% to 5% by weight) of all the monomers used in the synthesis of the acrylic polymer. When a hydroxy group-containing monomer is copolymerized in the acrylic polymer, from the standpoint of combining adhesive strength and cohesive strength, the hydroxy group-containing monomer content is preferably within a range of about 0.001% to 10% by weight (e.g. 0.01% to 5%, typically 0.02% to 2% by weight) of all the monomers used in the synthesis of the acrylic polymer. When a vinyl ester-based monomer such as vinyl acetate is copolymerized as the secondary monomer, the vinyl ester-based monomer content is preferably about 30% by weight or less (typically 0.01% to 30% by weight, e.g. 0.1% to 10% by weight) of all the monomers used in the synthesis of the acrylic polymer.

The method for obtaining the acrylic polymer is not particularly limited. Various polymerization methods known as procedures for the synthesis of acrylic polymer can be suitably employed, such as solution polymerization, emulsion polymerization, bulk polymerization and suspension polymerization. It is also possible to employ active energy ray radiation polymerization which involves irradiation of UV, etc. For instance, a desirable acrylic polymer can be obtained by dissolving or dispersing a monomer mixture in a suitable polymerization solvent (toluene, ethyl acetate, water, etc.) and carrying out polymerization using a polymerization initiator such as an azo-based polymerization initiator and a peroxide-based initiator.

From the standpoint of combining adhesive strength and cohesive strength in a well-balanced way, the acrylic polymer disclosed herein preferably has a weight average molecular weight (Mw) in a range of $10 \times 10^4$ or higher, but $100 \times 10^4$ or lower. An acrylic polymer whose Mw is $20 \times 10^4$ or higher, but $70 \times 10^4$ or lower (e.g. $30 \times 10^4$ or higher, but $50 \times 10^4$ or lower) may bring about better results. In this description, Mw refers to the value based on standard polystyrene obtained by GPC (gas permeation chromatography).

From the standpoint of increasing the cohesive strength, the PSA composition preferably comprises a crosslinking agent. The type of crosslinking agent is not particularly limited; one, two or more species can be suitably selected and used among heretofore known crosslinking agents. Preferable examples of the crosslinking agent include isocyanate-based crosslinking agents and epoxy-based crosslinking agents. The amount of the crosslinking agent used is not particularly limited. For instance, to 100 parts by weight of the acrylic polymer, it can be selected from a range of about 10 parts by weight or less (e.g. about 0.005 part to 10 parts by weight, preferably about 0.01 part to 5 parts by weight).

The PSA layer disclosed herein may have a composition comprising a tackifier. The tackifier is not particularly limited. Various tackifier resins can be used, such as rosin-based tackifier resin, terpene-based tackifier resin, hydrocarbon-based tackifier resin, epoxy-based tackifier resin, polyamide-based tackifier resin, elastomer-based tackifier resin, phenolic tackifier resin, and ketone-based tackifier resin. These tackifier resins can be used solely as one species or in a combination of two or more species.

The tackifier resin preferably has a softening point (temperature of softening) of about 60° C. or higher (preferably about 80° C. or higher, typically 100° C. or higher). By this, the PSA sheet can be obtained with higher adhesive strength. The upper limit of the softening point of the tackifier resin is not particularly limited; it can be about 180° C. or lower (e.g. about 140° C. or lower). The softening point of tackifier resin referred to herein is defined as the value measured by the softening point test method (ring and ball method) specified either in JIS K5902:2006 or in JIS K22012006.

The amount of tackifier resin can be suitably selected in accordance with the target adhesive properties (adhesive strength, etc.). For instance, by solid content, it is preferable to use a tackifier at a ratio of about 10 parts to 100 parts by weight (more preferably 20 parts to 80 parts by weight, or yet more preferably 30 parts to 60 parts by weight) relative to 100 parts by weight of the base polymer (preferably an acrylic polymer).

The PSA composition may comprise, as necessary, various additives generally known in the field of PSA compositions, such as leveling agent, crosslinking accelerator, plasticizer, softening agent, filler, anti-static agent, anti-aging agent, UV-absorbing agent, antioxidant and photo-stabilizing agent. With respect to these various additives, heretofore known species can be used by typical methods.

The PSA layer disclosed herein may be formed from aqueous, solvent-based, hot-melt, and active energy ray-curable types of PSA composition, etc. The aqueous PSA composition refers to a PSA composition in a form comprising PSA (PSA layer forming components) in a solvent whose primary component is water (in an aqueous solvent), typically including a so-called water-dispersed PSA composition (a composition in a form where at least part of the PSA is dispersed in water). The solvent-based PSA composition refers to a PSA composition in a form comprising PSA in an organic solvent. From the standpoint of reducing environmental stress, an aqueous PSA composition is preferable. From the standpoint of the adhesive properties, etc., a solvent-based PSA composition is preferably used.

The PSA layer disclosed herein can be formed by a heretofore known method. For instance, a transfer method can be preferably used, in which a PSA composition is provided to a releasable surface (a release face) and allowed to dry to form a PSA layer on the surface and the PSA layer is transferred to a substrate. Alternatively, a direct method can also be employed, in which a PSA composition is directly provided (typically applied) to a substrate and allowed to dry to form a PSA layer. As the release face, a release liner surface, the back face of a substrate treated with a release agent, and the like can be used.

The PSA composition can be applied using a known or commonly used coater, such as a gravure roll coater, reverse roll coater, kiss roll coater, comma coater, dip roll coater, die coater, bar coater, knife coater, and spray coater. Alternatively, the PSA composition can be applied by immersion, curtain coating, etc.

From the standpoint of facilitating the crosslinking reaction, increasing the productivity, etc., the PSA composition is preferably heated to dry. The drying temperature can be, for instance, about 40° C. to 150° C., or usually preferably about 60° C. to 130° C. After dried, the PSA composition can be further allowed to age for adjustment of migration of the components in the PSA layer, for the progress of the crosslinking reaction, for releasing the distortion possibly present in the substrate and PSA layer, etc.

The thickness of the PSA layer disclosed herein is not particularly limited; it can be suitably selected in accordance with the purpose. Usually, from the standpoint of the productivity such as the drying efficiency, adhesive properties, etc., it is suitably about 0.5 μm to 200 μm, or preferably about 2 μm to 200 μm (e.g. 5 μm to 100 μm, typically 10 μm to 50 μm). In a preferable embodiment, the thickness of the PSA layer is 20 μm or smaller, more preferably 10 μm or smaller, or yet more preferably 7 μm or smaller (e.g. 5 μm or smaller). According to the art disclosed herein, even in an embodiment where the PSA layer is limited in thickness as above, good air release properties can be obtained. It is advantageous to limit the thickness of the PSA layer in view of making the PSA sheet thinner, smaller, lighter, resource-saving, and so on. When the art disclosed herein is implemented in an embodiment of an adhesively double-faced sheet having a PSA layer on each face of a substrate, the thicknesses of the respective PSA layers can be the same or different.

<Coating Layer>

The coating layer partially covering the PSA layer surface is not particularly limited as long as it can provide air release properties. A favorable example of the coating layer material is a resin material. From the standpoint of the appearance, the coating layer is preferably formed from a transparent or semi-transparent resin material.

Examples of the resin material form which the coating layer can be formed include a polyurethane-based resin, a phenolic resin, an epoxy-based resin, a polyamide-based resin, a urea melamine-based resin, a silicone-based resin, a polysilazane-based resin, a fluororesin, a phenoxy resin, a methacrylic resin, an acrylic resin, an acrylic urethane-based resin, an acrylic styrene-based resin, a polyarylate resin, a polyester-based resin, a polyolefinic resin, a polystyrene-based resin, polyvinyl chloride, a vinyl chloride/vinyl acetate copolymer, polyvinyl acetate, polyvinylidene chloride, polycarbonate, a cellulose, and a polyacetal. The resin can be one, two or more species of resin selected from various types of resins including a heat-curable resin, a UV-curable resin, an electron beam-curable resin, and a two-component resin that is curable upon mixing.

The coating layer disclosed herein may comprise as necessary various additives such as fillers, anti-aging agent, antioxidant, UV absorber, crosslinking agent, slip agent, colorant (pigment, dye, etc.), antistatic agent, viscosity-adjusting agent (thixotropic agent, thickening agent, etc.), and film-forming aid.

The coating layer is typically non-adhesive or weakly adhesive. This preferably brings about good air release properties. Here, that the coating layer is non-adhesive or weakly adhesive means that the coating layer has a 180° peel strength less than 3 N/25 mm (typically less than 1 N/25 mm, including unmeasurably low adhesive strength). In particular, the 180° peel strength of the coating layer is determined by the following method: The PSA sheet having a coating layer over the entire PSA layer surface is cut to a 25 mm wide by 100 mm long size to obtain a measurement sample; in an environment at 23° C., 50% RH, the measurement sample is press-bonded over its coating layer surface to the surface of a stainless steel plate (SUS304BA plate) with a 2 kg roller moved back and forth once. If it does not adhere, it is considered non-adhesive here. The resultant is left standing in the same environment for 30 minutes. Using a universal tensile/compression tester, based on JIS Z 0237:2000, it is then measured for peel strength (N/20 mm) at a tensile speed of 300 mm/min at a peel angle of 180°.

The method for placing the coating layer on the PSA layer surface is not particularly limited. In typical, a method as described next is employed. In particular, a coating layer-forming composition is prepared as necessary by dissolution or dispersion in a suitable solvent. Subsequently, by employing a suitable method among various known or commonly-used printing methods, the composition is provided to a releasable surface of a releasable support (or a coating layer transferring film, typically a release liner) and allowed to cure. The releasable support surface on which the coating layer is formed is brought into contact with the PSA layer surface to transfer the coating layer onto the PSA layer surface. The coating layer is thus partially placed on the PSA layer surface. For instance, a desirable coating layer pattern such as a lattice pattern can be preferably formed by employing a method such as offset printing, silk screen printing, letterpress printing, flexographic printing, gravure printing, and inkjet printing. From the standpoint of the air release properties, gravure printing is more preferable. Alternatively, the same embodiment can also be obtained by forming a coating layer on a releasable surface as described above and further forming a PSA layer to cover the coating layer. In this case, the resulting PSA layer is subsequently transferred onto a surface of a substrate film. Based on technical common knowledge in the pertinent field, a skilled person can employ a method as described above, select a coating layer material in view of the wetting properties relative to the releasable surface of the releasable support, adjust the viscosity of the coating layer-forming composition to a suitable range, and further select, for instance, a suitable printing means to form a coating layer having a cross-sectional shape disclosed herein.

The thickness of the coating layer is less than 3 µm as described earlier. From the standpoint of combining air release properties and appearance, it is preferably up to about a half (e.g. up to one-third, typically up to one-fifth) the thickness of the PSA layer. In particular, from the standpoint of the air release properties, productivity, etc., the thickness of the coating layer is preferably 0.1 µm or greater (e.g. 0.5 µm or greater, typically 1 µm or greater).

<Release Liner>

The art disclosed herein is preferably implemented in an embodiment of a release liner-backed PSA sheet that has a release liner protecting the adhesive face of the PSA sheet. As the release liner, any conventional release paper or the like can be used without any particular limitations. For example, a release liner having a release layer on a surface of a liner substrate such as resin film (PET, etc.) and paper; a release liner formed from a poorly-adhesive material such as a fluorine-based polymer (polytetrafluoroethylene, etc.) or a polyolefin-based resin (PE, PP, etc.); or the like can be used. The release layer can be formed, for instance, by subjecting the liner substrate to a surface treatment with a release agent such as a silicone-based, a long-chain alkyl-based, a fluorine-based, a molybdenum disulfide-based release agent or the like.

In a preferable embodiment, the release surface (on the side that makes contact with the PSA sheet's adhesive face) of the release liner (release film) is formed smooth. A good coating layer transfer can be obtained when a coating layer is partially formed on the releasable surface of such a release liner and the release liner surface with the coating layer partially formed thereon is brought into contact with a PSA layer to transfer the coating layer onto the PSA layer surface (in this case, the release liner also serves as the coating layer-transferring film (release film)). The smooth texture of the surface of the release liner is transferred onto the PSA layer surface, whereby the adhesive properties tend to increase as well. Similar effects can be obtained by partially forming a coating layer on the releasable surface of such a release liner and further forming a PSA layer on the releasable surface with the coating layer formed thereon so as to cover the coating layer. In this case, the PSA layer formed is transferred to a surface of a substrate film. For these reasons, it is preferable that the release surface of the release liner has an arithmetic average surface roughness of 1 µm or less (e.g. about 0.05 µm to 0.75 µm, typically about 0.1 µm to 0.5 µm).

Figure 8:
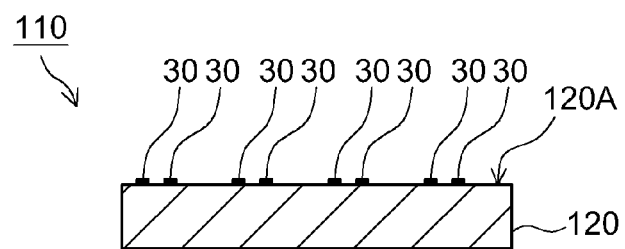
FIG. 8 shows a schematic cross-sectional diagram of the release liner for the PSA sheet according to an embodiment.

As shown in FIG. 8, the release liner used in fabricating the PSA sheet disclosed herein may be a coating layer-bearing release liner 110 that comprises a releasable support 120 having a releasable surface 120A. The releasable support 120 may have a release layer at least on one face of a liner substrate, or it can be a support formed from a low-adhesive material. The releasable surface 120A of the releasable support 120 is provided with a coating layer 30 that can be transferred to a PSA sheet. In other words, the coating layer 30 is arranged on the releasable surface 120A in a state that it can be separated by an adhesive strength of PSA, etc. With the use of such release liner 110 having a transferrable coating layer 30 on the surface, the PSA sheet disclosed herein is preferably fabricated. The features (shape, arrangement, relative position, size, pattern, etc.) of the coating layer provided to the releasable surface of the releasable support are basically the same as the features of the coating layer on the adhesive face of the PSA sheet described earlier. Thus, details are omitted. The linearly extending parts of the coating layer provided to the release liner are also basically as described earlier, except that the first face is on the releasable surface side and the second face forms the outer surface on the releasable face. Thus, details are omitted.

The thickness (overall thickness) of the release liner is not particularly limited. From the standpoint of the ease of removal, handling properties, strength, etc., it is preferably about 10 µm to 500 µm (e.g. 15 µm to 100 µm).

As described above, in applying the PSA sheet disclosed herein to an adherend, the sort of bubble formation can be efficiently prevented at the interface with the adherend. Thus, in either application method between application by hand (manual application) and application with an automated applicator or the like (automated application), the ease of application will improve. For example, when applied by manual application, the degree of dependence on skills of individuals can be reduced, thereby bringing about advantages such as increases in efficiency and quality of the application and their stabilization. When applied by automated application, failures during application such as trapping of bubbles and reapplication work can be reduced. Accordingly, either by manual application or by automated application, it is possible to bring about increases in application efficiency and quality, stabilization of the quality and so on, thereby increasing the productivity and quality of products made with the use of the PSA sheet as well. The art disclosed herein can bring about more uniform application; and therefore, it is particularly favorable as a PSA sheet that is applied with an automated applicator.

Between the PSA sheet and the adherend, the sort of bubble formation may occur, not just during the application, but also after the application as the time passes. In typical, after the PSA sheet is applied, upon storage and use in an environment at a relatively high temperature (e.g. 35° C. or higher), etc., aforementioned bubbles and the like may form between the PSA sheet and the adherend, causing degradation of the appearance. For instance, such high temperature conditions are likely to be reached in factories and outdoor in summer, inside electronics, etc. According to the art disclosed herein, even when used for applications exposed to such high temperature environments, the sort of bubble formation can be prevented.

With the benefit of the features described above, the PSA sheet disclosed herein can be preferably used for application to surfaces of various articles. In a preferable embodiment, it can be used as decorative sheets and surface protection sheets of various kinds, a fixing sheet for printing plates of flexographic printing and the like, a light-blocking sheet, and so on. For instance, it is preferable as a decorative sheet (typically a paint-substitute sheet) applied to vehicle exteriors, house building materials, and so on. It is also preferable for use inside electronics such as displays (typically TV displays) as a cover sheet used to increase the smoothness of the outer face of a chassis or to cover uneven places such as of screw holes in surfaces of various parts. The use of such a cover sheet can decrease unevenness of the appearance of the adherend's outer surface and make the dimensional precision uniform. It can also be preferably used as an exterior sheet for battery packs for which the appearance is important.

Even when made thin, with the PSA sheet disclosed herein, it is possible to prevent degradation of appearance quality after its application while maintaining good adhesive properties. Thus, it can be preferably used for applications (e.g. for mobile electronics) where a thinner build and a lighter weight are required desirably with saving of resources. In particular, it can be preferably used as a surface protection sheet for mobile electronics such as mobile phones, smartphones, tablet PCs, notebook PCs, various wearable devices (e.g. wrist wearables put on wrists such as wrist watches; modular devices attached to bodies with clips, straps, etc.; eye wears including eye glass types (monocular or binocular, including head-mounted pieces); clothing types worn as, for instance, accessories on shirts, socks, hats/caps, etc.; ear-mounted pieces put on ears such as earphones), digital cameras, digital video cameras, acoustic equipment (portable music players, IC recorders, etc.), calculators (e.g. pocket calculators), handheld game devices, electronic dictionaries, electronic notebooks, electronic books, vehicle navigation devices, portable radios, portable TVs, portable printers, portable scanners, and portable modems; for bonding/fixing applications in liquid crystal displays of these mobile electronics; for fixing protection panels (lenses) to protect the displays of these mobile electronics; for fixing key modules of mobile phones; for fixing rim sheets, decorative panels, batteries, and various other parts; fixing labels (including various marks) such as logos (letter logos) and various designs (symbols); and for like purposes. When used for the mobile electronics, the PSA sheet may have a shape in accordance with the purpose and so on, such as a frame shape and a ribbon shape (a strip shape). In this description, to be "mobile," it is not sufficient that it can be just carried, but it needs to be mobile enough for an individual (an average adult) to be able to carry it by hand relatively easily.

Matters disclosed by this description include the following:

(1) A PSA sheet for mobile electronics, with the PSA sheet comprising a substrate film and a PSA layer provided to at least one face of the substrate film, wherein
the PSA sheet further comprises a coating layer that partially covers the surface of the PSA layer, and
the coating layer has a thickness less than 3 µm.
(2) The PSA sheet according to (1) above, wherein the PSA layer has a thickness of 20 µm or less.
(3) The PSA sheet according to (1) or (2) above, wherein the PSA layer has a thickness $T_A$ and the coating layer has a thickness $T_C$ with a $T_C/T_A$ ratio value of 0.75 or less.
(4) The PSA sheet according to any one of (1) to (3) above, comprising, as the PSA layers, first and second PSA layers provided on first and second faces of the substrate film, respectively, wherein
the coating layer is partially placed on the surface of at least one PSA layer between the first and second PSA layers.
(5) The PSA sheet according to any one of (1) to (4) above, wherein the substrate film has a thickness less than 5 µm.
(6) The PSA sheet according to (5) above, having an overall thickness of 50 µm or less.
(7) The PSA sheet according to any one of (1) to (6) above, wherein the PSA layer comprises an acrylic polymer that accounts for more than 50% by weight of all polymers in the PSA layer, with the acrylic polymer comprising, as a monomer, more than 50% by weight of alkyl (meth)acrylate represented by a formula (1):

$$CH_2=C(R^1)COOR^2 \qquad (1)$$

(in the formula (1), $R^1$ is a hydrogen atom or a methyl group; $R^2$ is an acyclic alkyl group with 1 to 20 carbon atoms).
(8) The PSA sheet according to (7) above, wherein the alkyl (meth)acrylate is n-butyl acrylate and/or 2-ethylhexyl acrylate.
(9) The PSA sheet according to (7) or (8) above, wherein the acrylic polymer is an acrylic polymer in which a carboxy group-containing monomer and/or a hydroxy group-containing monomer is copolymerized as secondary monomer(s).
(10) The PSA sheet according to any one of (7) to (9) above, wherein the acrylic polymer is an acrylic polymer in which at least one species of secondary monomer selected from the group consisting of acrylic acid, methacrylic acid, 2-hydroxyethyl acrylate and 4-hydroxybutyl acrylate is copolymerized.

(11) The PSA sheet according to any one of (7) to (10) above, wherein a carboxy group-containing monomer is copolymerized in the acrylic polymer, the copolymerization ratio of the carboxy group-containing monomer being 0.1% to 10% (by weight) to all the monomers used in synthesizing the acrylic polymer.

(12) The PSA sheet according to any one of (7) to (11) above, wherein a hydroxy group-containing monomer is copolymerized in the acrylic polymer, the copolymerization ratio of the hydroxy group-containing monomer being 0.001% to 10% (by weight) to all the monomers used in synthesizing the acrylic polymer.

(13) The PSA sheet according to any one of (7) to (12) above, wherein the PSA layer comprises an isocyanate-based crosslinking agent and/or an epoxy-based crosslinking agent.

(14) The PSA sheet according to any one of (7) to (13) above, wherein the PSA layer comprises a tackifier resin with a softening point of 100° C. to 140° C. in an amount of 30 parts to 60 parts by weight to 100 parts by weight of the acrylic polymer, the tackifier resin being at least one species selected from the group consisting of a rosin-based tackifier resin, a terpene-based tackifier resin and a hydrocarbon-based tackifier resin.

(15) The PSA sheet according to any one of (1) to (14) above, wherein the coating layer comprises a transparent resin.

(16) The PSA sheet according to any one of (1) to (15) above, wherein the coating layer comprises at least one species of resins selected from the group consisting of a polyurethane-based resin, a phenolic resin, an epoxy-based resin, a polyamide-based resin, a urea melamine-based resin, a silicone-based resin, a polysilazane-based resin, a fluororesin, a phenoxy resin, a methacrylic resin, an acrylic resin, an acrylic urethane-based resin, an acrylic styrene-based resin, a polyarylate resin, a polyester-based resin, a polyolefinic resin, a polystyrene-based resin, polyvinyl chloride, a vinyl chloride/vinyl acetate copolymer, polyvinyl acetate, polyvinylidene chloride, polycarbonate, a cellulose, and a polyacetal.

(17) The PSA sheet according to any one of (1) to (16) above, wherein the coating layer is of a polyurethane-based resin.

(18) The PSA sheet according to any one of (1) to (17) above, wherein the coating layer is of a two-component polyurethane-based resin that is curable upon mixing.

(19) The PSA sheet according to any one of (1) to (18) above, wherein the substrate film is a polyolefinic resin film, a polyester-based resin film, a vinyl chloride-based resin film, a vinyl acetate-based resin film, a polyimide-based resin film, a polyamide-based resin film, a fluororesin film, or a cellophane film.

(20) The PSA sheet according to any one of (1) to (19) above, wherein the substrate film is a polyester film.

(21) The PSA sheet according to any one of (1) to (20) above, wherein the substrate film is a polyethylene terephthalate film.

(22) The PSA sheet according to any one of (1) to (21) above, wherein the substrate film exhibits a total light transmittance of 80% or higher.

(23) The PSA sheet according to any one of (1) to (18) above, wherein the substrate film is a foam film.

(24) The PSA sheet according to (23) above, wherein the foam film has a mean pore diameter of 10 μm to 200 μm and a density of 0.01 g/cm$^3$ to 0.7 g/cm$^3$.

(25) The PSA sheet according to (23) or (24) above, wherein the foam film is an acrylic resin foam or a polyolefinic resin foam.

(26) The PSA sheet according to any one of (1) to (25) above, having an adhesive face formed of the PSA layer and the coating layer, wherein
 the coating layer has a linearly extending part that runs from one edge to another edge of the adhesive face,
 the linearly extending part has a first face forming the adhesive face of the PSA sheet and a second face located on the PSA layer side relative to the first face, and
 the second face of the linearly extending part forms an overall gently curved line in a cross section that perpendicularly intersects the length direction of the linearly extending part.

(27) The PSA sheet according to (26) above, wherein, in the cross section that perpendicularly intersects the length direction of the linearly extending part, the second face of the linearly extending part has a segment that starts from one edge of the linearly extending part and runs towards the middle in a gently curved line in the depth direction of the PSA layer.

(28) The PSA sheet according to (26) or (27) above, wherein, in the cross section that perpendicularly intersects the length direction of the linearly extending part, the second face of the linearly extending part has an inclined segment that runs from one edge of the linearly extending part in the depth direction of the PSA layer and a flat segment that includes the deepest point of the linearly extending part and runs mostly parallel to the adhesive face.

(29) The PSA sheet according to (28) above, wherein the inclined segment is curved, convex on the PSA layer side.

(30) The PSA sheet according to any one of (27) to (29) above, wherein the linearly extending part has a thickness T and a width W with a W/T ratio of 50 or higher.

(31) The PSA sheet according to any one of (27) to (30) above, wherein the linearly extending part has a width of 100 μm or greater.

(32) The PSA sheet according to any one of (1) to (31) above, wherein the PSA layer surface has a coating layer-bearing area and a coating layer-free area, the coating layer-free area occupying 70% or more of the PSA layer surface.

(33) The PSA sheet according to (32) above, wherein the linearly extending part has a width in a range of 0.1 mm to 2 mm.

(34) The PSA sheet according to (32) or (33) above, wherein
 the PSA layer surface is provided with a plurality of the linearly extending parts among which the linearly extending parts in a group are placed at intervals arranged in the width direction, whereby the coating layer-bearing area has a stripe pattern.

(35) The PSA sheet according to (34) above wherein the coating layer-bearing area comprises a first stripe pattern and a second stripe pattern that is placed to intersect the first stripe pattern, whereby the coating layer-bearing area has a lattice pattern.

(36) The PSA sheet according to (34) or (35) above wherein, in the coating layer-bearing area, the intervals between the plurality of the linearly extending parts forming one stripe pattern are in a range of 1.0 mm to 10 mm.

(37) The PSA sheet according to any one of (32) to (36) above having an adhesive face on which the coating layer is partially placed, the adhesive face exhibiting a 180° peel strength after 24-hour adhesion of 13 N/25 mm or greater.

(38) A release liner-backed PSA sheet comprising the PSA sheet according to any one of (1) to (37) above and a release liner that protects an adhesive face of the PSA sheet.

(39) The release liner backed PSA sheet according to (39) above, wherein, of the surfaces of the release liner, the adhesive face-side surface is formed smooth (wherein the release liner has a smooth surface on the adhesive face side).

(40) A release liner for a PSA sheet, the release liner comprising a releasable support having at least one releasable face, wherein the releasable face of the releasable support is provided with a coating layer disclosed herein that can be transferred onto a PSA sheet.

(41) The release liner according to (40) above, wherein the coating layer has a linearly extending part that runs from one edge to another edge of the releasable face, the linearly extending part has a first face located on the releasable face side and a second face forming the outer surface on the releasable face, and the second face of the linearly extending part forms an overall gently curved line in a cross section that perpendicularly intersects the length direction of the linearly extending part.

(42) The release liner according to (40) or (41) above, wherein the coating layer has a thickness less than 3 µm.

(43) A method for producing the PSA sheet according to any one of (1) to (37) above, the method comprising:

a step of forming a PSA layer on a releasable face of a releasable support; and a step of transferring the PSA layer onto a surface of a substrate film, the method being characterized by the following features;

a coating layer is partially formed on the releasable face of the releasable support and the PSA layer forming step is a step of further forming the PSA layer on the releasable face where the coating layer has been formed; or no coating layer is formed on the releasable face of the releasable support, the releasable support is removed from the PSA layer after the PSA layer transferring step, a coating layer-bearing releasable support having a releasable face on which a coating layer is partially formed is obtained, and the coating layer-bearing releasable support is layered over the PSA layer so that the coating layer is transferred onto the adhesive face of the PSA sheet.

(45) A method for producing the PSA sheet according to any one of (1) to (37) above, the method comprising:

a step of forming a coating layer partially on a releasable face of a releasable support;

a step of further forming a PSA layer on the releasable face where the coating layer has been formed; and a step of transferring the PSA layer onto a surface of a substrate film.

Several Examples related to the present invention are described below, but the present invention is not intended to be limited to these Examples. In the description below, "parts" and "%" are by weight unless otherwise noted.

EXAMPLE 1

(Preparation of PSA Composition)

In a reaction vessel equipped with a stirrer, thermometer, nitrogen inlet, reflux condenser and addition funnel, were placed 70 parts of n-butyl acrylate, 30 parts of 2-ethylhexyl acrylate, 3 parts of acrylic acid, 0.05 part of 4-hydroxybutyl acrylate, 0.08 part of azobisisobutyronitrile as polymerization initiator and toluene as the polymerization solvent. Solution polymerization was carried out at 60° C. for 6 hours to obtain an acrylic polymer solution in toluene (viscosity 28 Pa·s, 40% non-volatiles). The resulting acrylic polymer had a Mw of about $44 \times 10^4$.

To 100 parts of the acrylic polymer in the toluene solution, was admixed 30 parts of a polymerized rosin pentaerythritol ester (trade name PENSEL D125 available from Arakawa Chemical Industries, Ltd.; softening point 125° C.) followed by 3 parts of an isocyanate-based crosslinking agent (trade name CORONATE L available from Nippon Polyurethane Industry Co., Ltd.) to prepare an acrylic PSA composition.

(Formation of Coating Layer)

A coating layer-forming material (urethane-based, two-component ink (curable when mixed)) was gravure-printed on the releasable face of 75 µm thick release film (trade name FMN-75WD (C1-CA1) available from Fujiko Co., Ltd.) to form a coating layer (coating thickness about 1.5 µm, transparent) in a lattice pattern. A coating layer-bearing release film was thus obtained, with the coating layer formed partially on the releasable face.

(Fabrication of PSA Sheets)

To the coating layer-bearing releasable face of the resulting coating layer bearing release film, the PSA composition was applied with a comma coater and allowed to dry to a final thickness of 4 µm to obtain a PSA layer supported on the release film. A 2 µm thick PET substrate film (trade name LUMIRROR SDC61 available from Toray Industries, Inc.) was obtained. Onto the first face (corona discharge-treated face) of the PET substrate, the resulting PSA layer was transferred along with the release film supporting it. The release film was used as it was to protect the PSA layer surface.

To the release agent-treated face of 38 µm thick release film (trade name DIAFOIL MRF-38 available from Mitsubishi Plastics, Inc.), the PSA composition was applied and allowed to dry to a final thickness of 4 µm to obtain a PSA layer supported on the release film. The resulting PSA layer was transferred along with the release film supporting it onto the second face (corona discharge-treated face) of the PET substrate. The release film was used as it was to protect the PSA layer surface.

By transferring the respective PSA layers onto the two faces of the PET substrate by the methods described above, a substrate-supported double-faced PSA sheet was fabricated, with the first face of the PET substrate provided with the coating layer-bearing PSA layer and the second face thereof provided with the coating layer free PSA layer. One of the adhesive faces of the PSA sheet was a coating layer-bearing adhesive face where the coating layer in the lattice pattern shown in FIG. 1 was formed, with each coating layer band having a width (line width) of about 0.2 mm and the coating layer bands having intervals of about 1.8 mm and a pitch of about 2 mm. The % surface area of the coating layer in the adhesive face of the PSA sheet was 19%. The other adhesive face of the PSA sheet was a coating layer-free adhesive face.

EXAMPLES 2 AND 3

The thicknesses of the coating layer and the PSA layer were changed to the values shown in Table 1. Otherwise in the same manner as Example 1, a PSA sheet according to each Example was fabricated.

EXAMPLES 4 AND 5

In fabricating the PSA sheets, a coating layer-free PSA layer was transferred to each face of a PET substrate; the release film was removed from one of the PSA layers and a coating layer-bearing release film was adhered. Otherwise in the same manner as Examples 1 and 2, were fabricated substrate-backed double-faced PSA sheets according to Examples 4 and 5, respectively. In each of the PSA sheets according to these Examples, the first face of the PET substrate is provided with the coating layer-bearing PSA layer and the second face with the coating layer free PSA layer.

EXAMPLE 6

The thickness of the coating layer was changed to the value shown in Table 1. Otherwise in the same manner as Example 4, a PSA sheet according to this Example was fabricated.

EXAMPLE 7

With the thickness of the coating layer changed to 4 μm, fabrication of a PSA sheet was attempted in the same manner as Example 3. The PSA composition could not be adequately applied to the coating layer bearing releasable face of the release film, whereby the fabrication of the PSA sheet failed

EXAMPLES 8 AND 9

No coating layers were formed, but otherwise in the same manner as Examples 1 and 3, PSA sheets according to Examples 8 and 9 were fabricated, respectively. In these Examples, the coating layer-bearing release film was not used; only the coating layer-free release film was used.

[Air Release Properties]

One face (the coating layer-free adhesive face) of the double-faced PSA sheet according to each Example was exposed, backed with 25 μm PET film, and cut to a 50 mm by 50 mm square to prepare a measurement sample. The other adhesive face (the coating layer-bearing adhesive faces for Examples 1 to 7) of the measurement sample was exposed and the measurement sample was placed (not press-bonded) on a horizontally laid stainless steel plate (SUS plate) as the adherend, with the other adhesive face being on the adherend side.

A bubble-forming rubber plate was then obtained, laid and pressed over the measurement sample to form bubbles between the adhesive face (the coating layer-bearing adhesive face) of the measurement sample and the adherend surface. In particular, as the bubble-forming rubber plate, was obtained a 50 mm by 50 mm square rubber plate having a 20 mm by 20 mm square opening (through hole) in the center of its face. The bubble-forming rubber plate was laid over the top face (the backed face) of the measurement sample and pressed from the top at 3 kgf for 5 seconds to press-bond the measurement sample's adhesive face (the coating layer bearing adhesive faces for Examples 1 to 7) and the adherend surface over the area corresponding to the frame shape of the rubber plate thereby to form bubbles between the measurement sample's adhesive face (the coating layer-bearing adhesive faces for Examples 1 to 7) and the adherend surface over the non-loaded area (20 mm by 20 mm square area) corresponding to the opening of the rubber plate.

The bubble-forming rubber plate was removed from the backed face of the measurement sample. A 50 mm by 50 mm square rubber plate (with no opening) was laid over the backed face of the measurement sample and pressed from the top at 3 kgf for 15 seconds. The rubber plate was removed and the degree of elimination of the pre-formed bubbles was visually inspected. When no bubbles were observed between the PSA sheet's adhesive face and the adherend, it was graded "Pass"; when some bubbles were observed, it was graded "Fail." As the rubber plate, was used trade name NEO-200 mm thick) available from Irumagawa Rubber Co., Ltd. As the bubble-forming rubber plate, the same type of rubber plate was processed and used.

[Effective Adhesive Strength (Surface Condition of Adhesive Face)]

One face (the coating layer free adhesive face) of the double-faced PSA sheet according to each Example was exposed, backed with 50 μm thick PET film, and cut to a 20 mm by 100 mm size to prepare a measurement sample. Of the measurement sample, the other adhesive face (the coating layer-bearing adhesive faces for Examples 1 to 7) was exposed. In an environment at 23° C., 50% RH, the exposed adhesive face of the measurement sample was press-bonded to the surface of a stainless steel plate (SUS plate) with a 5 kg roller moved back and forth once. The resultant was left standing in the same environment for 24 hours. Subsequently, using a universal tensile/compression tester, based on JIS Z 0237:2000, the peel strength (N/20 mm) (24-hour adhesion strength) was determined at a tensile speed of 300 mm/min at a peel angle of 180°.

With the reference peel strength $P_C$ of the coating layer-free PSA sheet (with 100% PSA layer and 0% coating layer in the surface area of the adhesive face) corresponding to each Example being 100%, the % surface area of the coating layer in the adhesive face of the PSA sheet according to each Example was subtracted to determine the theoretical peel strength (theoretical value) $P_T$ (N/20 mm) of the PSA sheet according to each Example. In particular, the peel strength of Example 8 was used as the reference peel strength $P_C$ for Examples 1, 2 and 4 to 6; the peel strength of Example 9 was used as the reference peel strength $P_C$ for Examples 3 and 7; from the % surface area of the coating layer in the adhesive face (coating layer-bearing adhesive face) of the PSA sheet being 19% (100%-19%=81%), the theoretical peel strength $P_T$ ($P_T=P_C\times 0.81$) was determined.

When the actual measured value $P_M$ (the peel strength of the PSA sheet according to each Example measured under the conditions described above) was 90% or more of the theoretical peel strength $P_T$ (i.e. when $P_M \geq P_T \times 0.9$), it can be judged that the coating layer formed on the PSA layer surface fit well in the PSA layer, and the PSA sheet's adhesive face (coating layer-bearing adhesive face) had a good surface condition to achieve a near-theoretical value. In other words, when $P_M \geq P_T \times 0.9$ was satisfied, it was graded "Pass"; when not, it was graded "Fail."

[Tolerance for Thickness]

With the PSA sheet obtained according to each Example, using a dial gauge, at 10 points of intersection in the coating layer lattice and 10 center points of rectangular areas with the exposed PSA layer surrounded by the coating layer in the lattice pattern, the thickness was measured. The maximum value $T_M$ (μm) and the standard thickness $T_S$ (μm) of the thickness values were substituted into a formula $(T_M-T_S)/T_S \times 100$ and the resulting value was used as the tolerance (%) for thickness. When the tolerance for thickness of the PSA sheet was 50% or lower, it was graded Pass; when the tolerance for thickness was above 50%, it was graded Fail.

TABLE 1

|  |  | Ex. 1 | Ex. 2 | Ex. 3 | Ex. 4 | Ex. 5 |
|---|---|---|---|---|---|---|
|  | Construction* | Release film<br>PSA (4 μm)<br>PET film (2 μm)<br>PSA (4 μm)<br>Release film | Release film<br>PSA (4 μm)<br>PET film (2 μm)<br>PSA (4 μm)<br>Release film | Release film<br>PSA (1.5 μm)<br>PET film (2 μm)<br>PSA (1.5 μm)<br>Release film | Release film<br>PSA (4 μm)<br>PET film (2 μm)<br>PSA (1.5 μm)<br>Release film | Release film<br>PSA (4 μm)<br>PET film (2 μm)<br>PSA (4 μm)<br>Release film |
|  | Thickness of coating layer (μm) | 1.5 | 2.8 | 1.5 | 1.5 | 2.8 |
|  | Overall thickness of PSA sheet (μm) | 10 | 10 | 5 | 10 | 10 |
|  | Air release properties | Pass | Pass | Pass | Pass | Pass |
| Effective adhesive strength | 24-h Adhesion strength Measured value $P_M$ (N/20 mm) | 10.0 | 9.0 | 3.3 | 10.0 | 9.0 |
|  | 24-h Adhesion strength Theoretical value $P_T$ (N/20 mm) | 9.7 | 9.7 | 3.6 | 9.7 | 9.7 |
|  | $P_M/P_T$ | 103% | 93% | 91% | 103% | 93% |
|  | Grade | Pass | Pass | Pass | Pass | Pass |
| Tolerance for thickness | Test results | 20% | 20% | 40% | 20% | 45% |
|  | Grade | Pass | Pass | Pass | Pass | Pass |

|  |  | Ex. 6 | Ex. 7 | Ex. 8 | Ex. 9 |
|---|---|---|---|---|---|
|  | Construction* | Release film<br>PSA (4 μm)<br>PET film (2 μm)<br>PSA (4 μm)<br>Release film | Release film<br>PSA (1.5 μm)<br>PET film (2 μm)<br>PSA (1.5 μm)<br>Release film | Release film<br>PSA (4 μm)<br>PET film (2 μm)<br>PSA (4 μm)<br>Release film | Release film<br>PSA (1.5 μm)<br>PET film (2 μm)<br>PSA (1.5 μm)<br>Release film |
|  | Thickness of coating layer (μm) | 4 | 4 | — | — |
|  | Overall thickness of PSA sheet (μm) | 10 | 5 | 10 | 5 |
|  | Air release properties | Pass | — | Fail | Fail |
| Effective adhesive strength | 24-h Adhesion strength Measured value $P_M$ (N/20 mm) | 8.0 | — | 12.0 | 4.5 |
|  | 24-h Adhesion strength Theoretical value $P_T$ (N/20 mm) | 9.7 | — | 12.0 | 4.5 |
|  | $P_M/P_T$ | 82% | — | 100% | 100% |
|  | Grade | Fail | — | Reference | Reference |
| Tolerance for thickness | Test results | 55% | — | 20% | 20% |
|  | Grade | Fail | — | Pass | Pass |

*The thickness of each layer is shown in parentheses.

Table 1 shows the summarized features and test results of the PSA sheets according to the respective Examples. As shown in Table 1, in Examples 1 to 6, good air release properties were obtained each with the coating layer as the air-eliminating means being placed on the PSA layer surface. On the other hand, with respect to Examples 8 and 9 free of the coating layer, the bubbles were not eliminated and they failed the air release test. In Examples 1 to 5 each having a coating layer with thickness less than 3 μm, the tolerance for thickness of the PSA sheets was in the range of 50% or below while in the PSA sheet of Example 6 with the coating layer thicker than 3 μm, the tolerance for thickness was above 50%. This suggests that with the coating layer having a thickness less than 3 μm, degradation of the smoothness of the PSA sheet's adhesive face caused by the coating layer was reduced. Furthermore, with the PSA sheets of Examples 1 to 5 all exhibiting 90% or greater effective adhesive strength, it has been shown that the intended adhesive properties appear effective from relatively early stages after applied to adherends. On the other hand, in Example 6, the effective adhesive strength was lower as compared to Examples 1 to 5. This result suggests that when the coating layer is thin, the PSA sheet's adhesive face formed of the PSA and the coating layer fit well with the adherend.

These results indicate that when the thickness of the coating layer is less than 3 μm, good air release properties are obtained with a smooth adhesive face of the PSA sheet and good adhesive properties are exhibited from an early stage after applied to an adherend.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST 1, 2 PSA sheets
1A adhesive face
10 substrate film
20, 21, 22 PSA layers
20A PSA layer surface
30 coating layer
40 coating layer pattern (lattice pattern)
42 first stripe pattern
44 second stripe pattern
50 linearly extending part (band)
52 first face
54 second face
56 one edge (left edge) of the width direction of a linearly extending part
58 other edge (right edge) of the width direction of a linearly extending part 60 inclined segment
62 flat segment
70 coating layer-bearing area
72 coating layer-free area
100, 101, 102 release liners
110 coating layer-bearing release liner
120 releasable support
120A releasable face

The invention claimed is:
1. A pressure-sensitive adhesive sheet for mobile electronics, the pressure-sensitive adhesive sheet comprising a substrate film and a pressure-sensitive adhesive layer provided to at least one face of the substrate film, wherein
the pressure-sensitive adhesive layer has a thickness of 20 μm or less,
the pressure-sensitive adhesive sheet further comprises a coating layer that partially covers the surface of the pressure-sensitive adhesive layer,
the coating layer has a thickness less than 3 μm,
the coating layer has a linearly extending part that runs from one edge to another edge of the adhesive face, the linearly extending part has a first face forming the adhesive face of the pressure-sensitive adhesive sheet and a second face located on the pressure-sensitive adhesive layer side relative to the first face, and the second face of the linearly extending part forms an overall gently curved line in a cross section that perpendicularly intersects the length direction of the linearly extending part,
a surface area of the pressure-sensitive adhesive sheet that is free of the coating layer is 70% or higher, and
the adhesive face of the pressure-sensitive adhesive sheet has an adhesive strength of 2N/20 mm or greater after 24-hour adhesion.

2. The pressure-sensitive adhesive sheet according to claim 1, wherein the pressure-sensitive adhesive layer has a thickness $T_A$ and the coating layer has a thickness $T_C$ with a $T_C/T_A$ ratio value of 0.75 or less.

3. The pressure-sensitive adhesive sheet according to claim 1, comprising, as the pressure-sensitive adhesive layers, a first pressure-sensitive adhesive layer provided on a first face of the substrate film and a second pressure-sensitive adhesive layer provided on a second face of the substrate film, wherein
the coating layer is placed partially on the surface of at least one of the first and second pressure-sensitive adhesive layers.

4. The pressure-sensitive adhesive sheet according to claim 1, wherein the substrate film has a thickness less than 5 μm.

5. The pressure-sensitive adhesive sheet according to claim 4, having an overall thickness of 50 μm or less.

6. The pressure-sensitive adhesive sheet according to claim 1, wherein the pressure-sensitive adhesive layer comprises an acrylic polymer that accounts for more than 50% by weight of all polymers in the pressure-sensitive adhesive layer, with the acrylic polymer comprising, as a monomer, more than 50% by weight of alkyl (meth)acrylate represented by a formula (1):

$$CH_2=C(R^1)COOR^2 \qquad (1)$$

wherein $R^1$ is a hydrogen atom or a methyl group; $R^2$ is an acyclic alkyl group with 1 to 20 carbon atoms.

7. The pressure-sensitive adhesive sheet according to claim 6, wherein a carboxy group-containing monomer is copolymerized in the acrylic polymer, the copolymerization ratio of the carboxy group-containing monomer being 0.1% to 10% by weight to all monomers used in the synthesis of the acrylic polymer.

8. The pressure-sensitive adhesive sheet according to claim 6, wherein a hydroxy group-containing monomer is copolymerized in the acrylic polymer, the copolymerization ratio of the hydroxy group-containing monomer being 0.001% to 10% by weight to all monomers used in the synthesis of the acrylic polymer.

9. The pressure-sensitive adhesive sheet according to claim 6, wherein the pressure-sensitive adhesive layer comprises an isocyanate-based crosslinking agent and/or an epoxy-based crosslinking agent.

10. The pressure-sensitive adhesive sheet according to claim 6, wherein the pressure-sensitive adhesive layer comprises a tackifier resin with a softening point of 100° C. to 140° C. in an amount of 30 parts to 60 parts by weight to 100 parts by weight of the acrylic polymer, and
the tackifier resin is at least one species selected from the group consisting of a rosin-based tackifier resin, a terpene-based tackifier resin and a hydrocarbon-based tackifier resin.

11. The pressure-sensitive adhesive sheet according to claim 1, wherein the coating layer comprises a transparent resin.

12. The pressure-sensitive adhesive sheet according to claim 1, wherein the coating layer comprises a polyurethane-based resin.

13. The pressure-sensitive adhesive sheet according to claim 1, wherein the substrate film is a polyester film.

14. The pressure-sensitive adhesive sheet according to claim 1, wherein the substrate film exhibits a total light transmittance of 80% or higher.

15. The pressure-sensitive adhesive sheet according to claim 1, wherein the substrate film is a foam film.

16. The pressure-sensitive adhesive sheet according to claim 15, wherein the foam film has a mean pore diameter of 10 μm to 200 μm and a density of 0.01 g/cm³ to 0.7 g/cm³.

17. The pressure-sensitive adhesive sheet according to claim 15, wherein the foam film is an acrylic resin foam or a polyolefinic resin foam.

18. A release liner-backed pressure-sensitive adhesive sheet comprising the pressure-sensitive adhesive sheet according to claim 1 and a release liner that protects the adhesive face of the pressure-sensitive adhesive sheet.

19. The release liner-backed pressure-sensitive adhesive sheet according to claim 18, wherein the release liner has a smooth surface on the adhesive face side.

* * * * *